April 21, 1970 J. F. IRWIN 3,507,008
MACHINE FOR MAKING SHAPED WORK PIECES FROM A WEB
OF THERMOPLASTIC MATERIAL
Filed Aug. 7, 1967 14 Sheets-Sheet 1

INVENTOR.
JERE F. IRWIN
By
ATTORNEY.

April 21, 1970     J. F. IRWIN     3,507,008
MACHINE FOR MAKING SHAPED WORK PIECES FROM A WEB
OF THERMOPLASTIC MATERIAL
Filed Aug. 7, 1967     14 Sheets-Sheet 4

INVENTOR.
JERE F. IRWIN
By
ATTORNEY.

April 21, 1970  J. F. IRWIN  3,507,008
MACHINE FOR MAKING SHAPED WORK PIECES FROM A WEB
OF THERMOPLASTIC MATERIAL
Filed Aug. 7, 1967  14 Sheets-Sheet 7
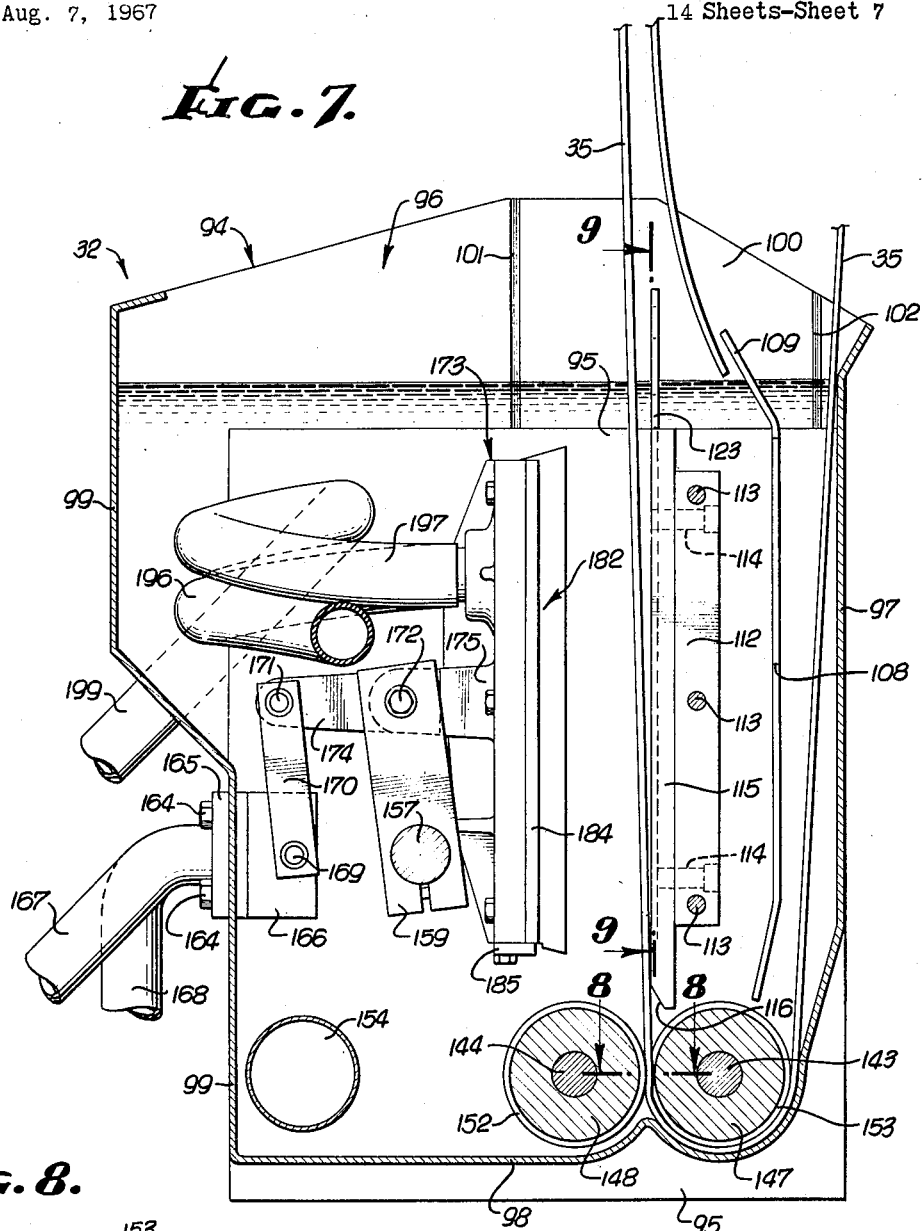
FIG. 7.
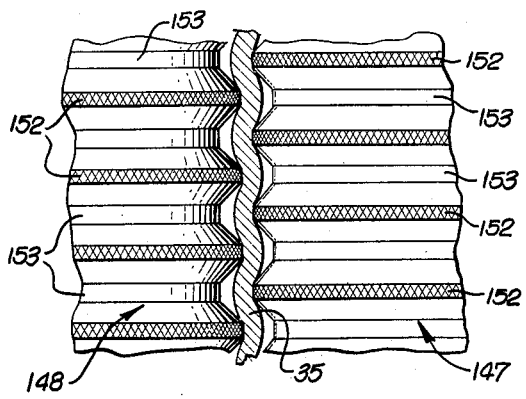
FIG. 8.
INVENTOR.
JERE F. IRWIN
By
ATTORNEY.

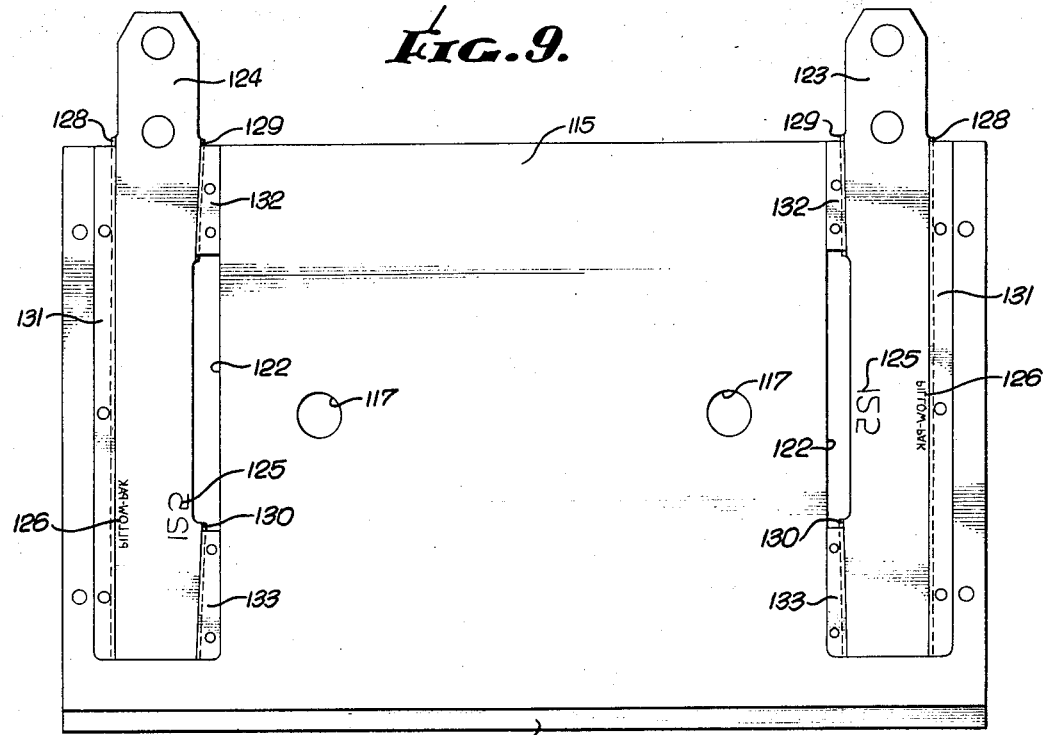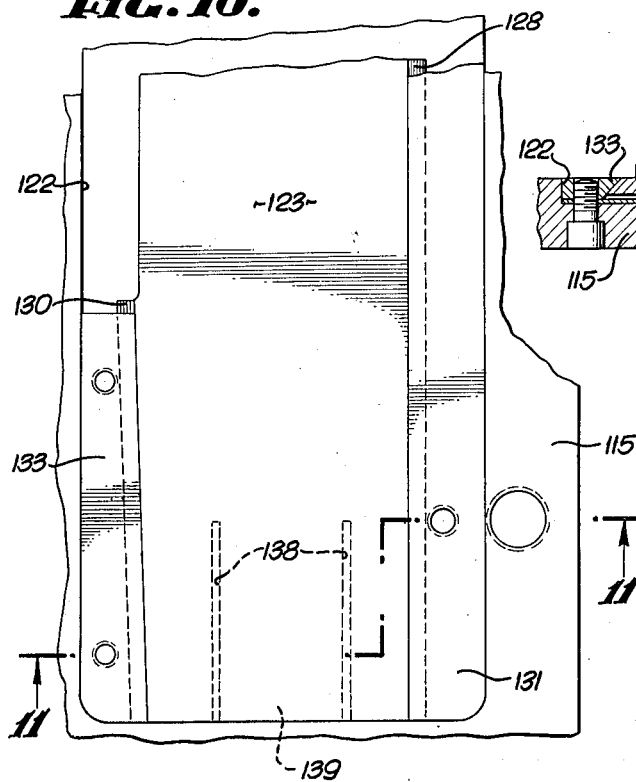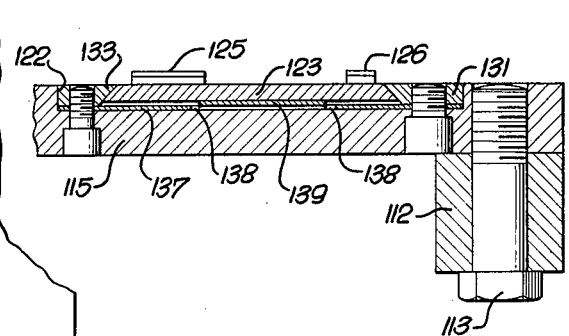

INVENTOR.
JERE F. IRWIN
By
ATTORNEY.

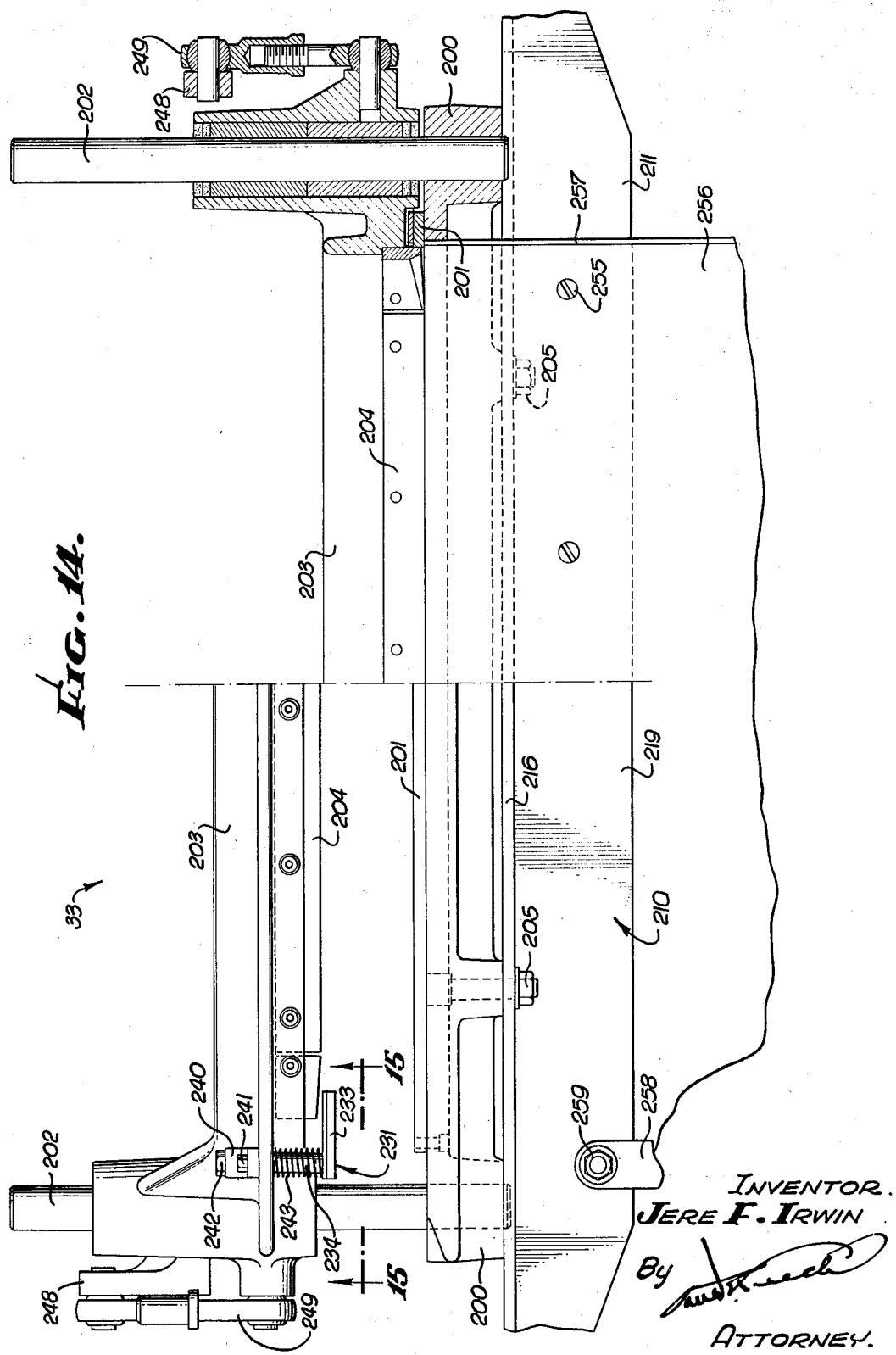

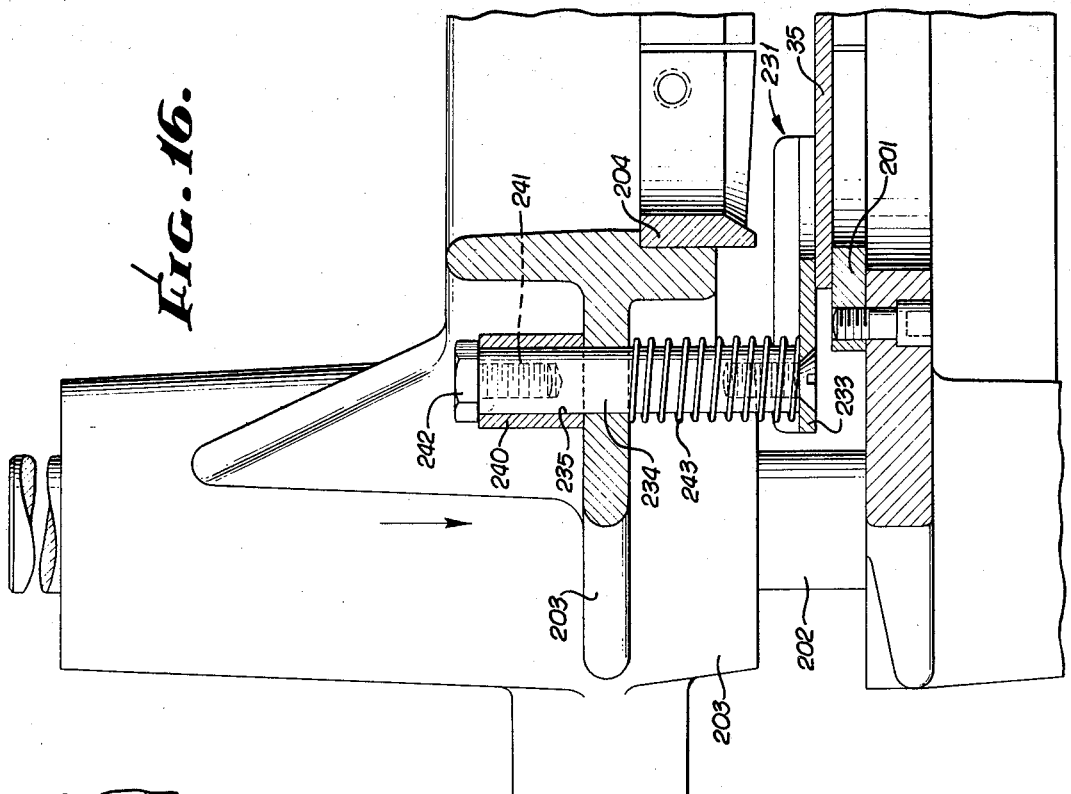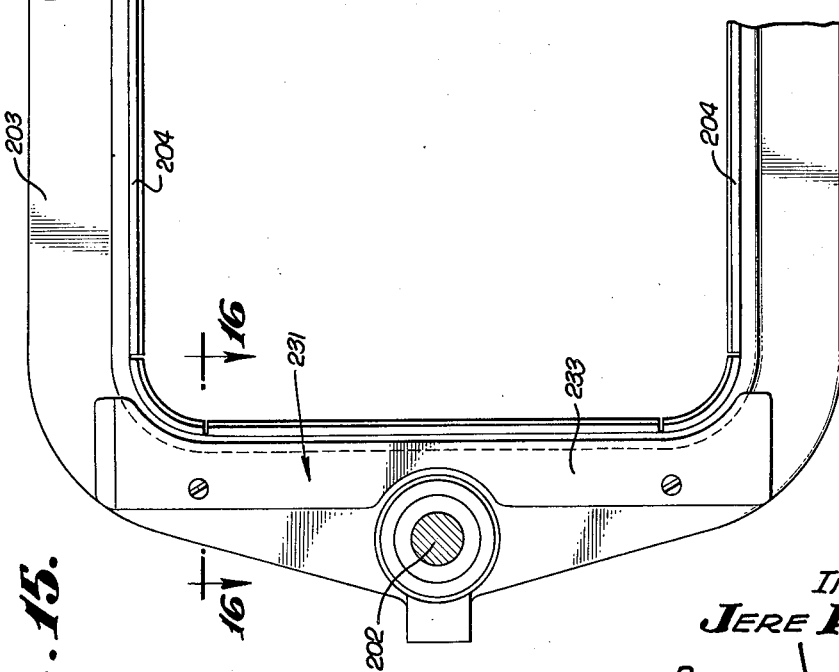

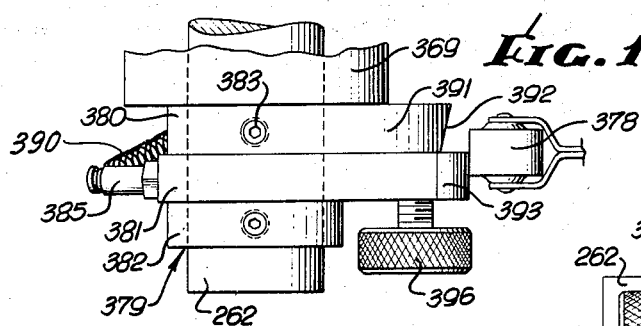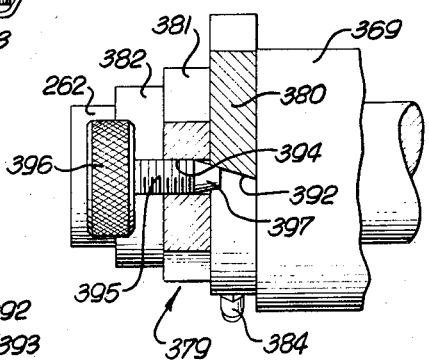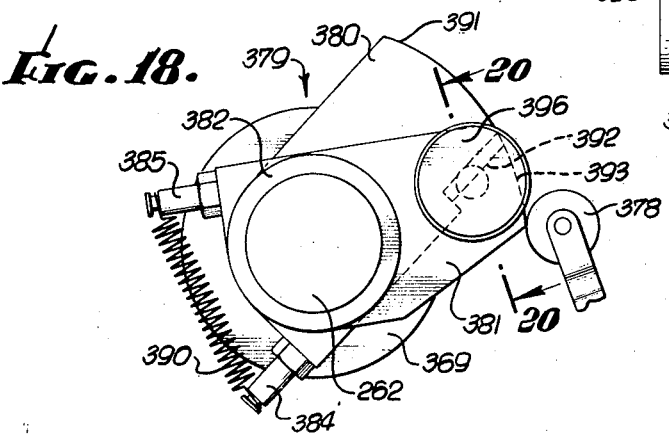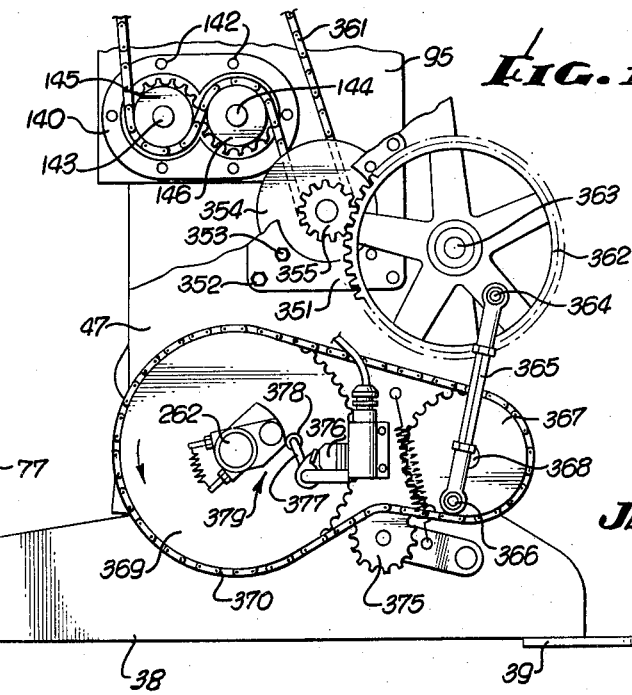

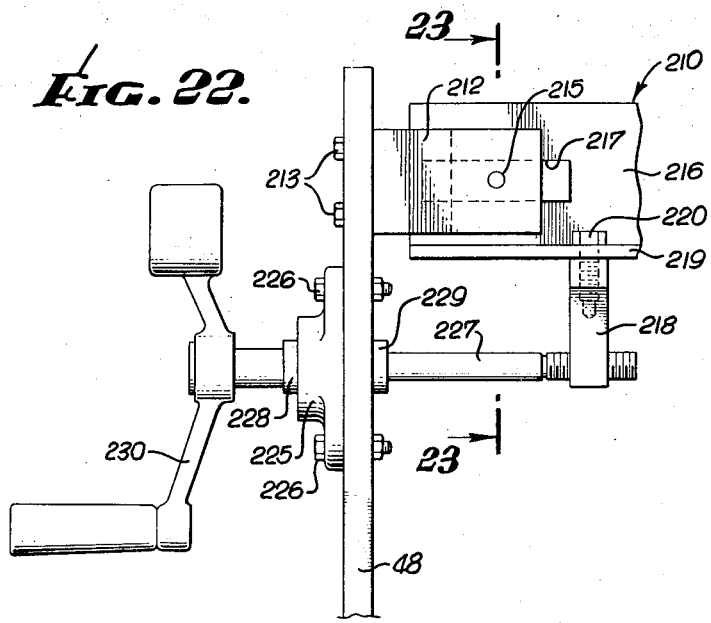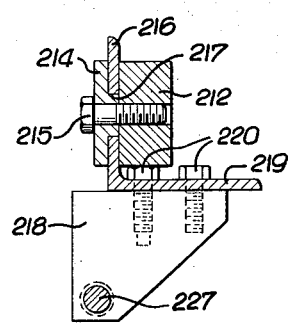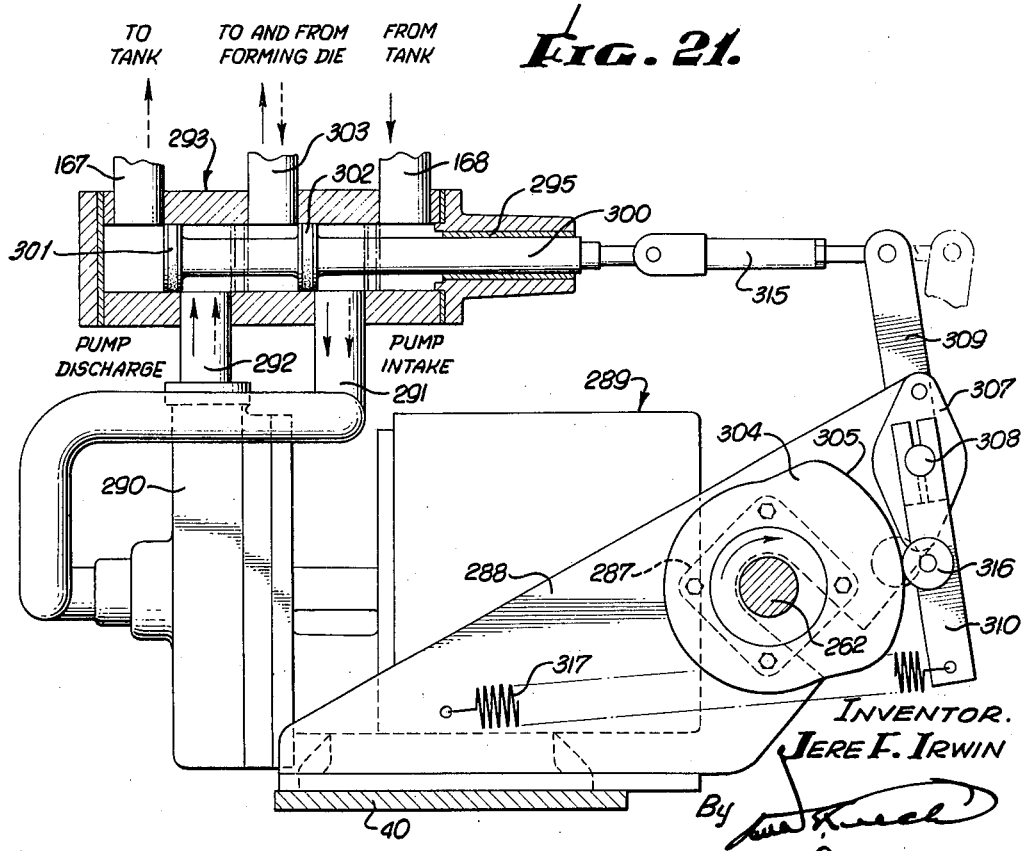

April 21, 1970  J. F. IRWIN  3,507,008
MACHINE FOR MAKING SHAPED WORK PIECES FROM A WEB
OF THERMOPLASTIC MATERIAL
Filed Aug. 7, 1967  14 Sheets-Sheet 14
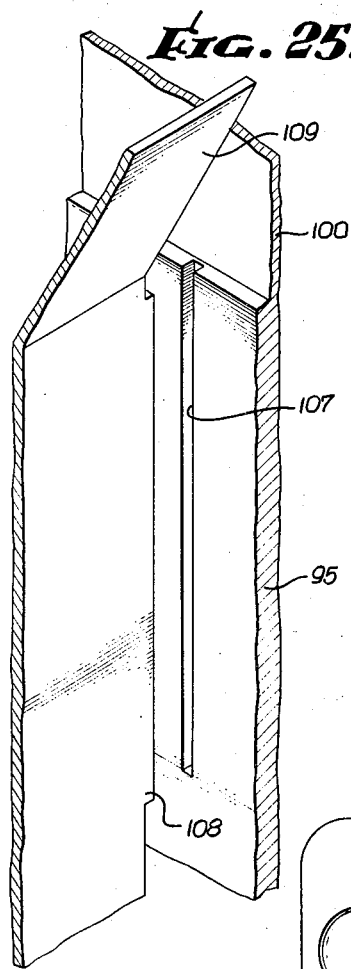
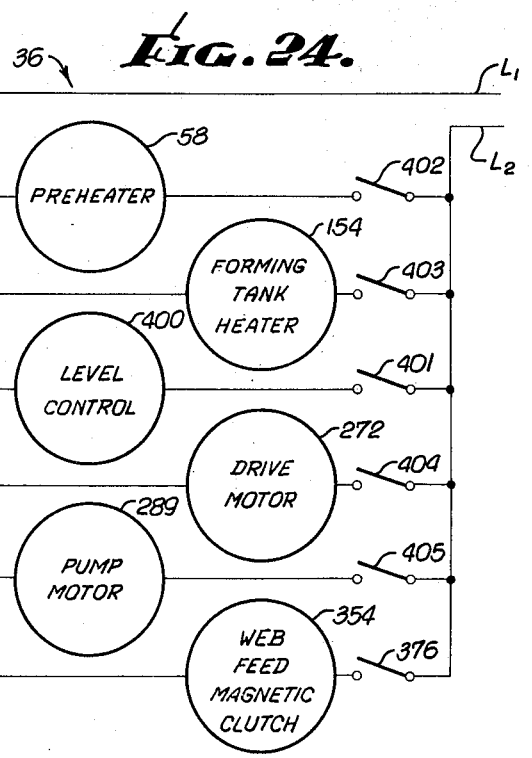
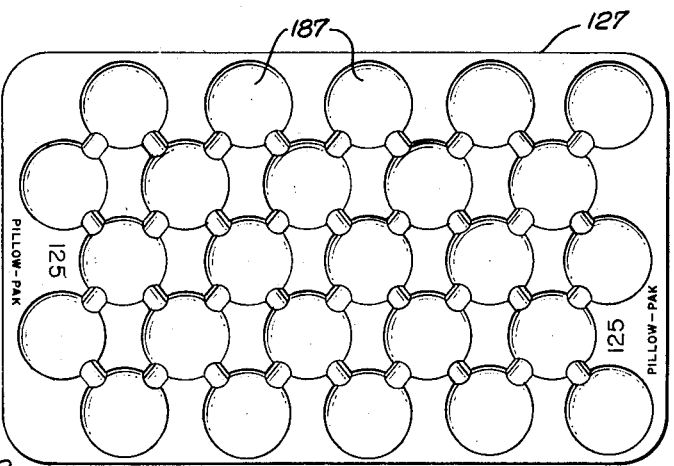
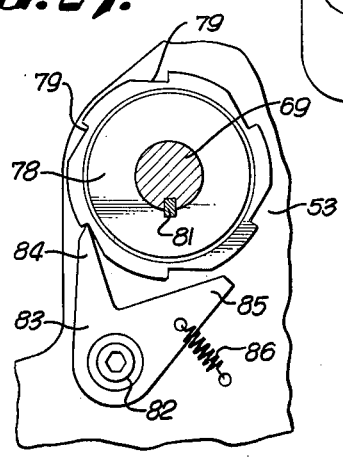
INVENTOR.
JERE F. IRWIN
By
ATTORNEY.

United States Patent Office 3,507,008
Patented Apr. 21, 1970

3,507,008
MACHINE FOR MAKING SHAPED WORK PIECES FROM A WEB OF THERMOPLASTIC MATERIAL
Jere F. Irwin, Yakima, Wash., assignor to Boise Cascade Corporation, Boise, Idaho, a corporation of Delaware
Filed Aug. 7, 1967, Ser. No. 658,817
Int. Cl. B29c 17/00
U.S. Cl. 18—19
10 Claims

ABSTRACT OF THE DISCLOSURE

Thermoplastic material such as expanded sheet styrene is first extruded in a long web which is about an inch and one-half wider than a pocket forming fruit packing tray to be made therefrom, the flat web being stored in rolls which are then fed one at a time through a machine so as to travel first downwardly and upwardly through a preheating bath of water and then downwardly and upwardly through a second bath of hot water and through a hydro-vacuum forming mold submerged therein which shapes the area of said web corresponding to each tray to be formed therewith the pockets required in said tray. This occurs during each of an endless series of cyclic pauses in the travel of the web through the machine, the web then resuming its travel between a die and cutter so that each area in the web shaped as aforesaid to produce a tray, arrives at and is halted between said die and cutter and has a tray cut therefrom during a successive pause in the travel of said web through said machine. Incidental to the reciprocation of the hydro-vacuum mold in the vacuum shaping of each tray, a trademark is die stamped by the machine on the tray thus shaped while it still remains a part of said web.

BACKGROUND OF THE INVENTION

Field of the invention

The development of methods and machines for lowering the cost and improving the quality of articles made from expanded styrene in sheet form.

Description of the prior art

The only prior art of which the applicant has knowledge is a prior method of and machine for manufacturing expanded styrene products in sheet form in which the web of sheet styrene was heated in preparation for the forming step by being caused to travel through a hot air tunnel about ten feet long in which the air was held at a temperature of about 400°, this high temperature being required because of the low rate of transfer of heat from air to expanded styrene. Following this step the web of expanded styrene was clamped along its side edges while it was being shaped by a die stamping operation.

Considerable waste was unavoidable in this prior art method because of the substantial marginal portion of the web that had to be clamped during the die forming of the product. Another drawback was in the fire hazard incurred by the high temperature existing in the warming tunnel in case a shut-down of the machine became necessary. In such a circumstance, the web of material in the tunnel was subject to burning thus destroying a relatively large amount of material incident to any substantial interruption in the smooth flow of material through the machine.

SUMMARY OF THE INVENTION

One of the objects of the present invention is to provide a simplified machine for forming sheet expanded styrene products which is relatively small in size and low in cost as compared with the best equipment previously available for accomplishing such manufacture.

Dependence on hot air for preheating step was abandoned at the outset to eliminate the large and hazardous piece of equipment required by it. The present invention embarked upon the development of an entirely new mode of supplying heat to the styrene sheet and preparing this for the molding operation and the water used in heating the material was also used to form the same imposing a hydraulic vacuum within the hollows of the forming mold. Following each hydraulic forming step, the forming area in the web opposite the mold is rapidly ejected from the hollows of the mold as the latter is withdrawn from proximity with the web so as not to impede resumption of the linear travel of the web at the start of the next forming cycle.

Adjustable coordination of the molding and die cutting mechanisms of the machine permits the successful shaping and die cutting of articles from the web of material moving through the machine so as to reduce the waste in the web from which the articles are cut to marginal strips averaging around ¼″ in width.

Another object is to produce a machine for making packing trays of expanded styrene which can be profitably sold at a price individual fruit packers can afford to pay and which will solve the packer's problem of supplying himself with trays as they are needed both in quantity and for the particular fruit sizes found to predominate in the lots coming in from different orchards. A different number of layers of fruit are packed in a standard shipping carton depending on the size of the fruit. The number of pieces packed to the box is used as the number indicating fruit of that particular size. That number is embossed by the present invention on the trays being manufactured by it for packing fruit of that size. The tray illustrated in FIGURES 15 and 26 for instance has twenty-five pockets in it and there are five such trays used in packing a box of fruit of size No. 125.

The present invention is equipped with a variety of forming molds and a variety of pairs of embossing dies and the mold and dies for producing trays for one particular size of fruit may be replaced in only a few minutes by the mold and dies for producing a different style of tray for use in packing another one of the standard sizes of fruit. This facility renders the present invention suitable for rapidly producing trays as and when these are required in the fruit packing operations of the owner.

BRIEF DESCRIPTION OF THE DRAWINGS

FIGURE 7 is a vertical sectional view taken on the line 7—7 of FIGURE 6.
FIGURE 8 is a fragmentary enlarged full scale sectional view taken on the line 8—8 of FIGURE 7.
FIGURE 9 is a detail face view of the embossing back plate of the forming tank of the invention and is taken on the line 9—9 of FIGURE 7.
FIGURE 10 is a fragmentary enlarged detail face view of a lower right hand corner portion of the back plate shown in FIGURE 9.
FIGURE 11 is a fragmentary horizontal sectional view taken on the line 11—11 of FIGURE 10.

FIGURE 14 is an enlarged view partly in section and partly in elevation taken on the line 14—14 of FIGURE 4 and illustrating open and closed operational aspects of the cutting mechanism of the invention.

FIGURE 15 is a fragmentary elevational view taken on the line 15—15 of FIGURE 14 and illustrating the web stripper of said cutting mechanism.

FIGURE 16 is an enlarged detail sectional view taken on the line 16—16 of FIGURE 15 and illustrates said stripper as this just comes in contact with a sheet styrene web as the cutter of the cutting mechanism moves toward the die thereof in performing a tray cutting operation.

FIGURE 17 is a fragmentary view similar to a lower portion of FIGURE 5 and illustrates the web feed controlling microswitch at the conclusion of a web feeding operation during a given operational cycle of the invention.

FIGURE 18 is an enlarged end elevational view of said micro-switch actuating cam.

FIGURE 19 is a plan view of FIGURE 18.

FIGURE 20 is a detail sectional view taken on the line 20—20 of FIGURE 18.

FIGURE 21 is a diagrammatic enlarged sectional view illustrating the hydraulic tray forming control valve and the manner in which this is cam actuated between two positions to coordinately evacuate liquid from within the tray forming mold to suck the material of the styrene web into the hollows of the mold and subsequently expell said web from said hollows by a reversal of the direction of flow of liquid through said mold.

FIGURE 22 is an enlargement of an upper left hand corner portion of FIGURE 2 and illustrates the means for slideably mounting the cutting mechanism of the invention so that this may be adjustably positioned to bring the same into symmetrical relation with the web of sheet styrene when the latter arrives opposite said cutting mechanism so that the waste occurring on opposite sides of the trays cut from said web shall be approximately equal in width.

FIGURE 23 is a cross-sectional view taken on the line 23—23 of FIGURE 22.

FIGURE 24 is a wiring diagram of the machine of the invention.

FIGURE 25 is a fragmentary perspective view illustrating the manner of slideably mounted the web guide plate in the forming tank side walls.

FIGURE 26 is a plan view of a typical fruit packing tray for packing fruit of size No. 125, such as is shown being molded in FIGURE 12.

FIGURE 27 is an enlarged detail vertical sectional view taken on line 27—27 of FIGURE 2 and illustrates the ratchet means for manually setting the depth of the web sinking roller in the preheating tank of the invention and thus determining the length of time which the web is preheated in said tank.

DESCRIPTION OF THE PREFERRED EMBODIMENT

Figure 1:
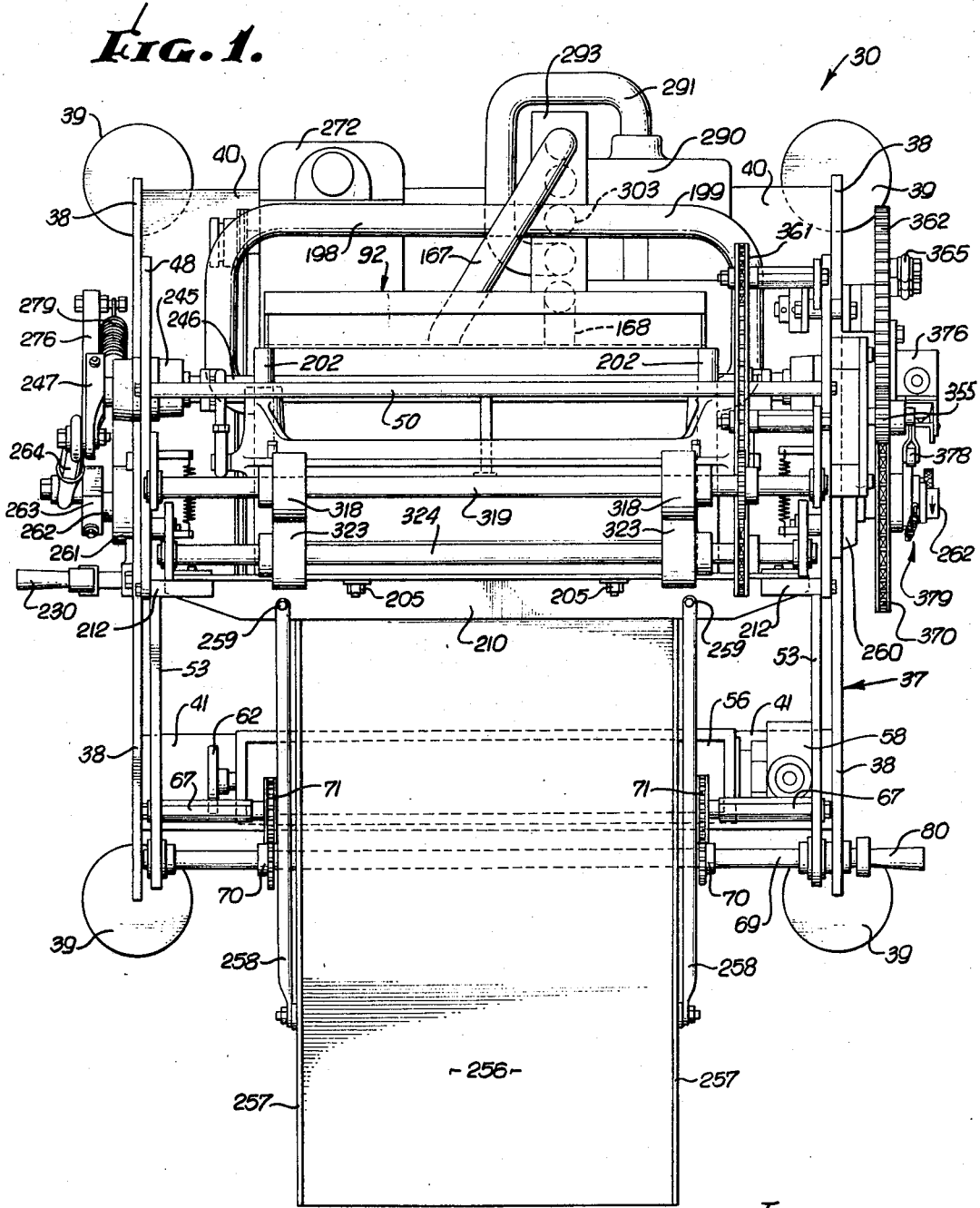
FIGURE 1 is a plan view of a preferred embodiment of the invention.
Figure 2:
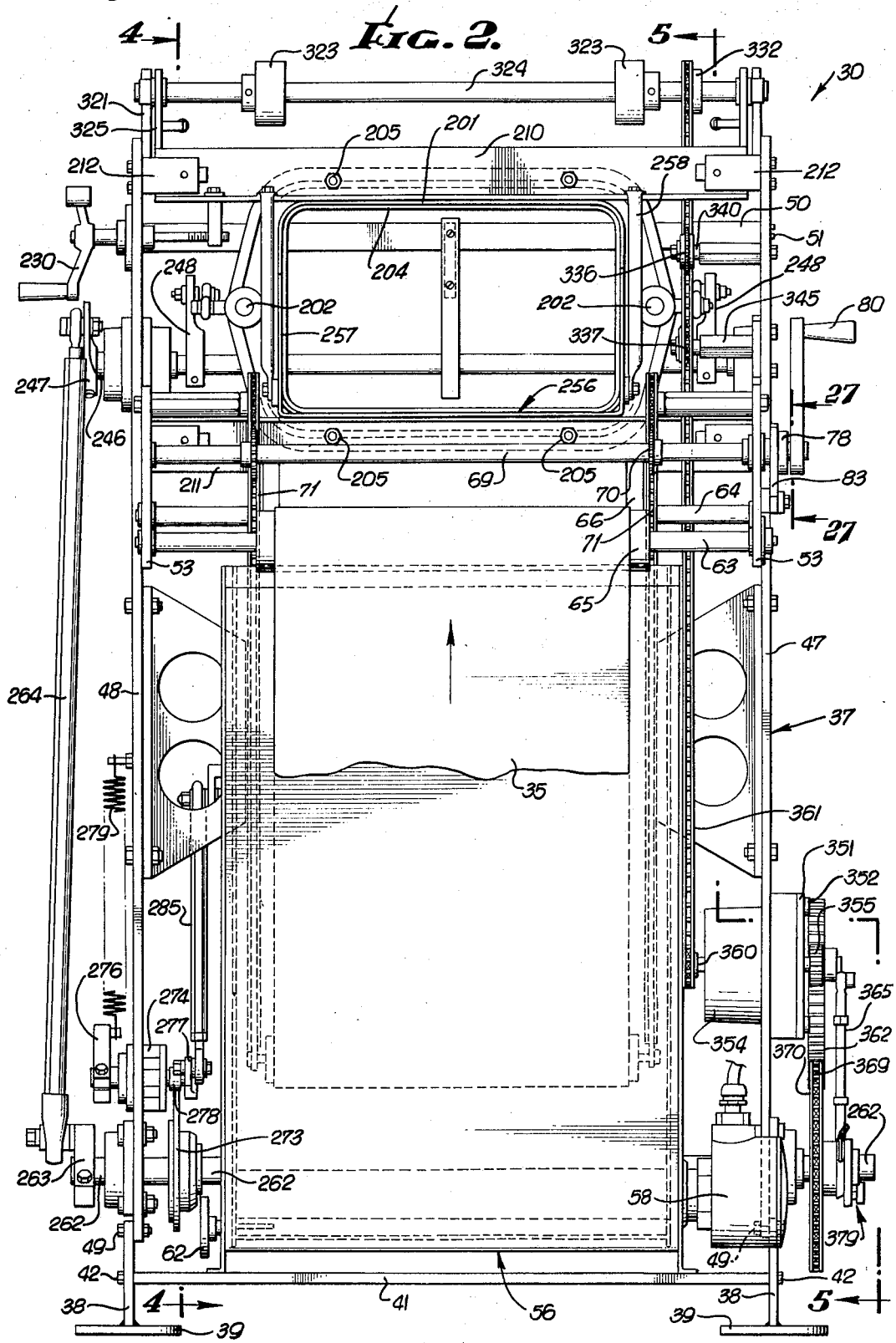
FIGURE 2 is a front elevational view of FIGURE 1.

Referring specifically to the drawings, the preferred machine 30 of the invention there illustrated includes four main functional mechanisms, to wit: a web preheater 31, a web forming and embossing mechanism 32, a tray cutting mechanism 33, and a web feeding mechanism 34 which feeds a web 35 of sheet expanded styrene through the other three mechanisms, these four mechanisms being powered and controlled by an electrical power system powered and controlled by an electrical power system 36.

Figure 3:
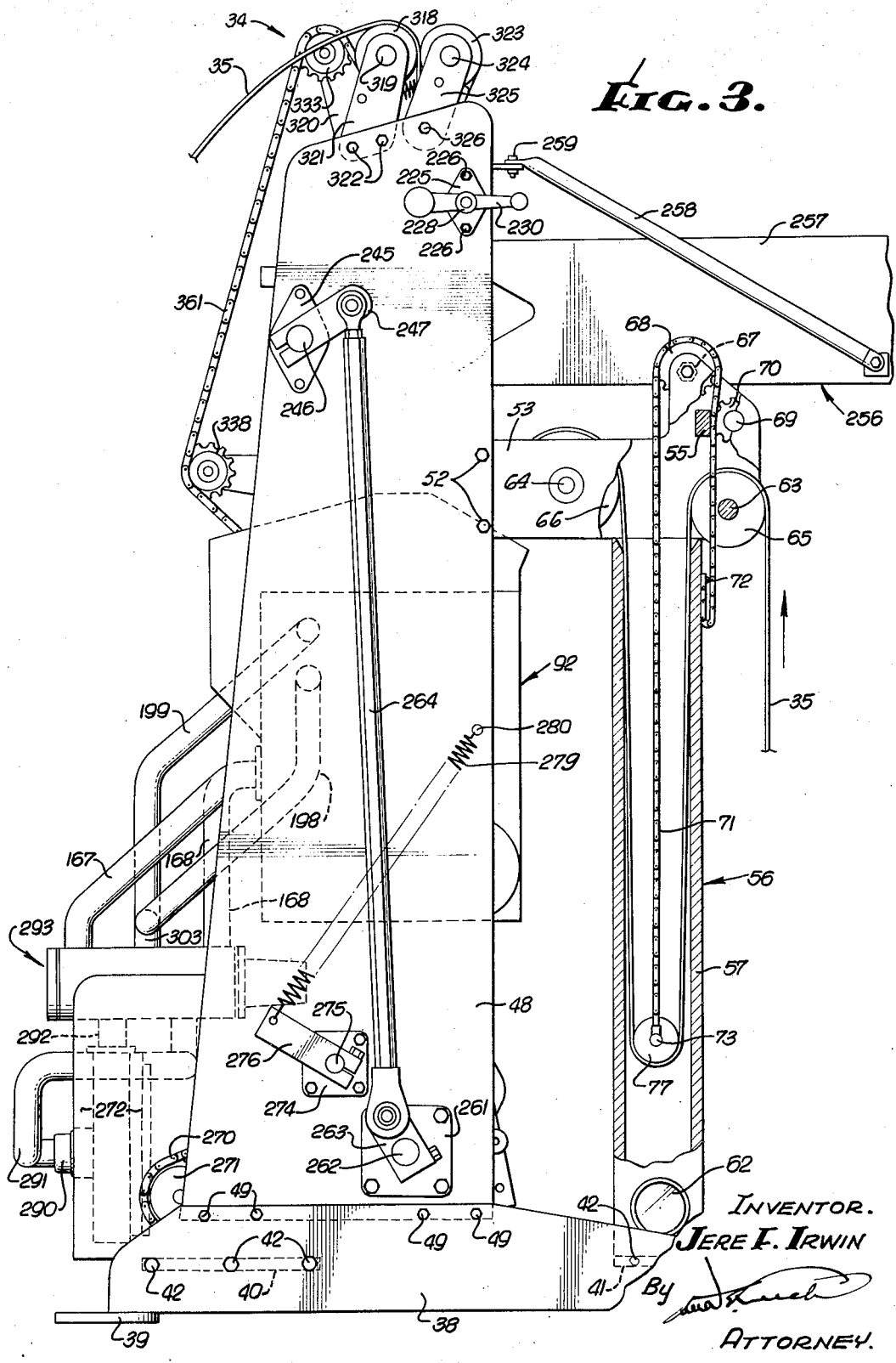
FIGURE 3 is a left side elevational view of FIGURE 1.

The aforesaid mechanisms are mounted on a frame 37 which includes a pair of base sides plates 38 having flat footing discs 39 at their opposite ends through which the weight of the machine is transmitted to the floor. The base side plates 38 are rigidly united in parallel spaced relation by horizontal base plates 40 and 41 which are united to the side base plates 38 by cap screws 42. The frame 37 also includes main side plates 47 and 48 which, with a few exceptions to be noted later are identical, lower edge portions of these plates inwardly overlapping upper edge portions of the base side plates 38 and being rigidly secured thereto by bolts 49. Main side plates 47 and 48 are held apart near their upper ends in rigidly spaced parallel relation by spacer bar 50, opposite ends of which are secured to said plates by cap screws 51. Overlapping inwardly upper middle front edge portions of main side plates 47 and 48 and secured thereto by bolts 52 are vertical web preheater frame plates 53 which are shaped as shown in FIGURE 3. Secured at its opposite ends by cap screws 54 to plates 53 so as to rigidly secure these in parallel spaced relation is a spacer bar 55.

Web preheater 31

Rigidly secured to horizontal base plate 41 and extending vertically therefrom is a preheating tank 56 which has insulated walls 57 and is equipped at its lower end with a thermostatically controlled electric heater 58 and a thermometer 62.

Freely rotatably supported in suitable bearings mounted in frame plates 53 are shafts 63 and 64 which are respectively provided with rollers 65 and 66 over which said web 35 is adapted to be fed into and from the preheating tank 56.

Figure 4:
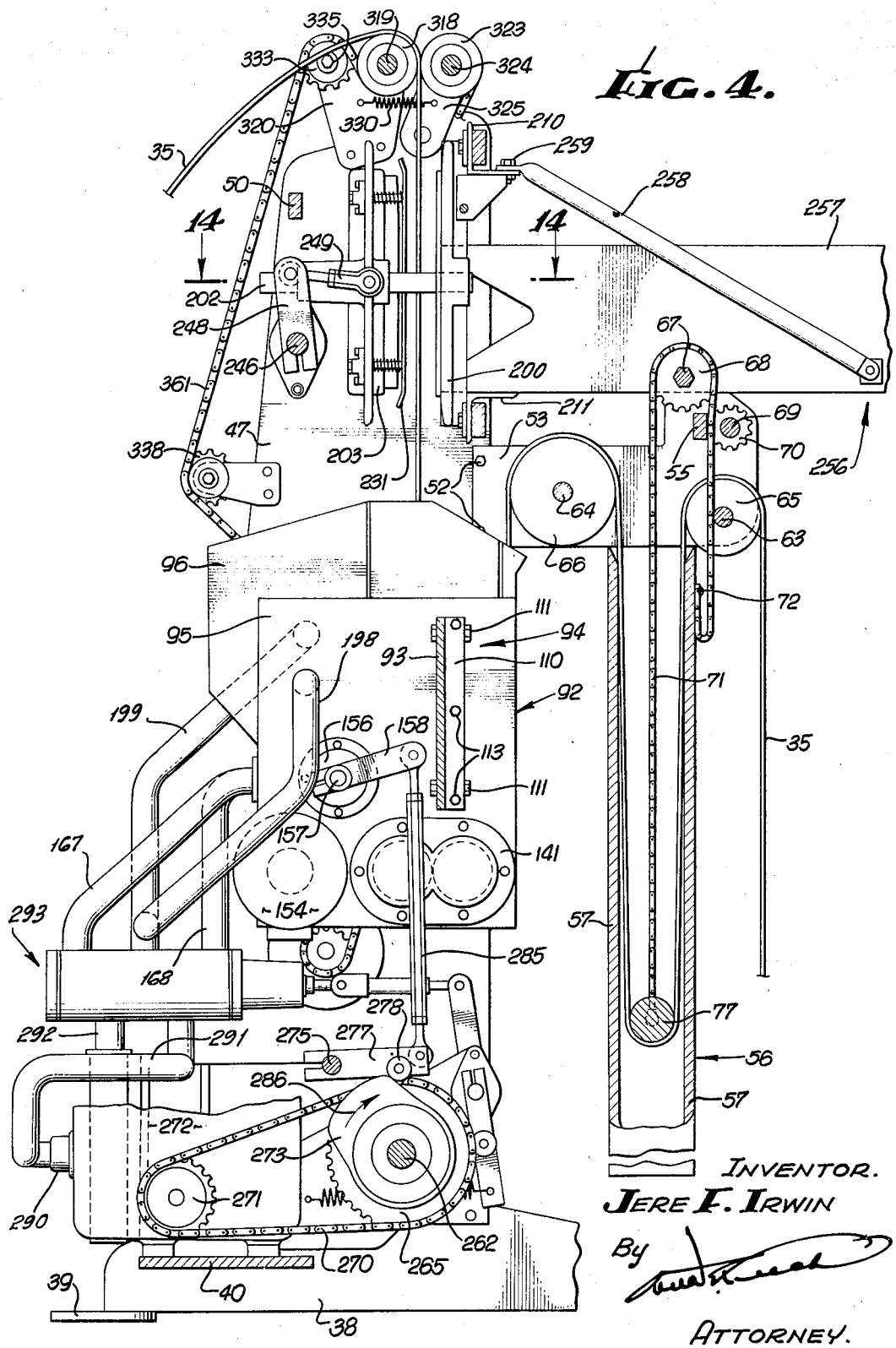
FIGURE 4 is a vertical sectional view taken on the line 4—4 of FIGURE 2.
Figure 5:
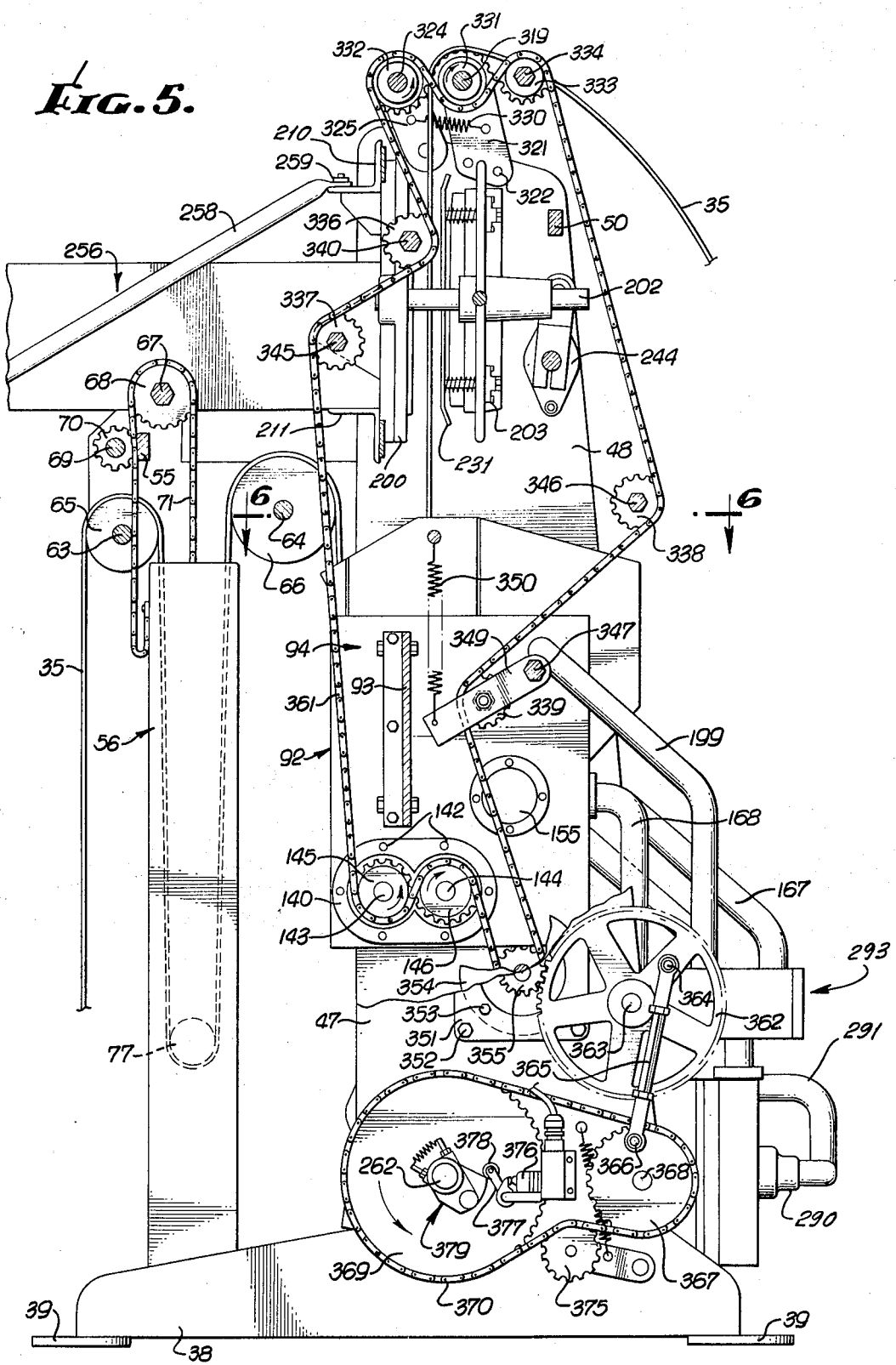
FIGURE 5 is a vertical sectional view taken on the line 5—5 of FIGURE 2.

Fixed on upwardly extending portions of frame plates 53 and extending inward therefrom are horizontal hexagonal studs 67 on the inner ends of which are pivotally mounted idle sprockets 68. On an axis forwardly from and below the pivotal axis of said sprockets, a shaft 69 is rotatably mounted in suitable bearings provided on said plates. Fixed on shaft 69 are a pair of sprockets 70, the diameter of which is such that the teeth of said sprockets pass very close to the front surface of spacer bar 55 as shown in FIGURES 3, 4 and 5. A pair of chains 71 are secured at their outer ends by screws 72 to the front face of preheating tank 56 just below roller 65, these chains being in alignment with sprockets 68 and 70 and passing upwardly in meshing relation with sprocket 70 and between this sprocket and spacer bar 55 and then upwardly around idle sprockets 68 and downwardly to their lower ends at which said chains support spaced aligned bearings 73 which pivotally support opposite ends of a web sinking roller 77.

The right end of shaft 69 extends laterally to receive a ratchet disc 78, the periphery of which is provided with a series of notches 79, and a crank handle 80, said ratchet disc and crank handle being keyed by a key 81 to shaft 69. Pivotally mounted on a bearing 82 mounted outwardly on the adjacent frame plate 53 so as to be in radial alignment with the notches 79 on ratchet disc 78 is a pawl having a latch dog 84 and an idle dog 85 which may be optionally and selectively brought into engagement with the periphery of ratchet disc 78 but which is normally biased by a spring 86 to bring the latch dog 84 into engagement with said disc. When the crank handle 80 is rotated in a clockwise direction, the pawl 83 idles over the periphery of the ratchet disc 78 and drops into the nearest notch 79 located thereabove when the handle 80 is released. Such rotation of handle 80 rotates shaft 69 in a clockwise direction and lowers the web sinking roller 77 a distance equivalent to the distance on the periphery of ratchet disc 78 which has been caused to pass upwardly past latch dog 84 of pawl 83 by the rotation of the handle 80. To lower the web sinking roller 77 in preheating tank 56, the handle 80 is merely started in a clockwise rotation enough to free pawl 83 from pressure from the ratchet disc 78, the swinging of pawl 83 to bring the idle dog 85 into engagement with the disc 78, and then rotating the crank handle 80 in a counter clockwise direction through the desired angle and releasing the pawl 83 to allow the latch dog 84 thereof to engage the next notch 79 of the disc 78 to halt the counter clockwise rotation of shaft 69. The purpose of providing this adjustment will be made clear hereinafter.

Web forming and embossing mechanism 32

Referring now particularly to FIGURES 4 to 13 inclusive, this mechanism includes a forming tank 92 which is suspended between right and left main side plates 47 and 48 on heavy brackets 93 which are bolted both to said side plates and to end walls 94 of said tank. The end walls 94 are fabricated to include a half inch thick rectangular plate 95 and a relatively thin sheet aluminum element 96 which extends upwardly and rearwardly from an upper portion of plate 95 and is welded thereto. Disposed between the end walls 94 and welded thereto to complete the forming tank 92 are front, bottom and rear walls 97, 98 and 99, respectively, which are shaped as shown in FIGURE 7 from a single sheet of thin aluminum of uniform width and then welded at their opposite edges to end walls 94 to complete said tank. The element 96 lies in a flat plane and the inner face thereof is flush with the inner face of the rectangular plate 95 on which it is welded, excepting for a section 100 of said element which is shaped outwardly along vertical lines 101 and 102 so that the flat outer face of each element 96 in section 100 thereof is flush with the outer face of the plate 95 of end wall 94 of which that element is a part.

Figure 6:
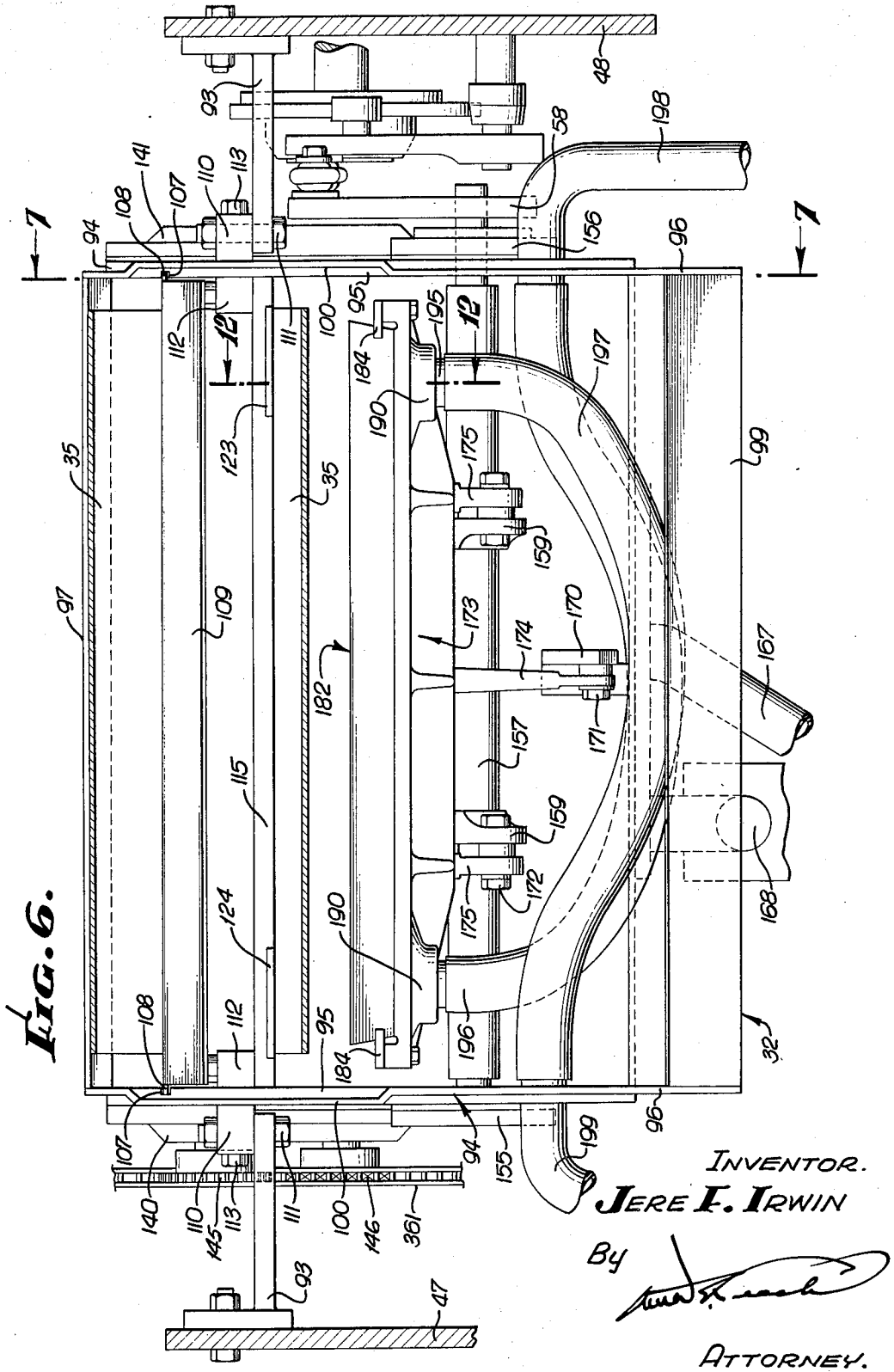
FIGURE 6 is an enlarged fragmentary horizontal sectional view taken on the line 6—6 of FIGURE 5.

In a vertical plane spaced rearwardly a short distance from front wall 97 of the forming tank 92, grooves 107 are formed in the inner faces of plates 95 of end walls 94. These grooves are provided to slideably receive shallow lugs 108 which extend laterally from side edges of a web guide plate 109 whereby said plate may be readily mounted in a place in tank 92 by a downward sliding movement and is readily removed by a reverse sliding movement (FIGURES 6, 7 and 25). Upper extremities of the front wall 97 and the web guide plate 109 are bent away from each other to assist in guiding the web 35 downwardly into the space between said wall and said plate, as shown in FIGURE 7.

The means for mounting the forming tank 92 on the heavy brackets 93 include heavy bars 110 which are secured by bolts 111 to inner edges of the brackets 93 and companion bars 112 which are located inside the tank 92 directly opposite to the bars 110, said bars being secured together by cap screws 113 which extend through the bars 110 and tank end walls 94 and are screwed into tapped holes provided therefor in companion bars 112.

Figure 13:
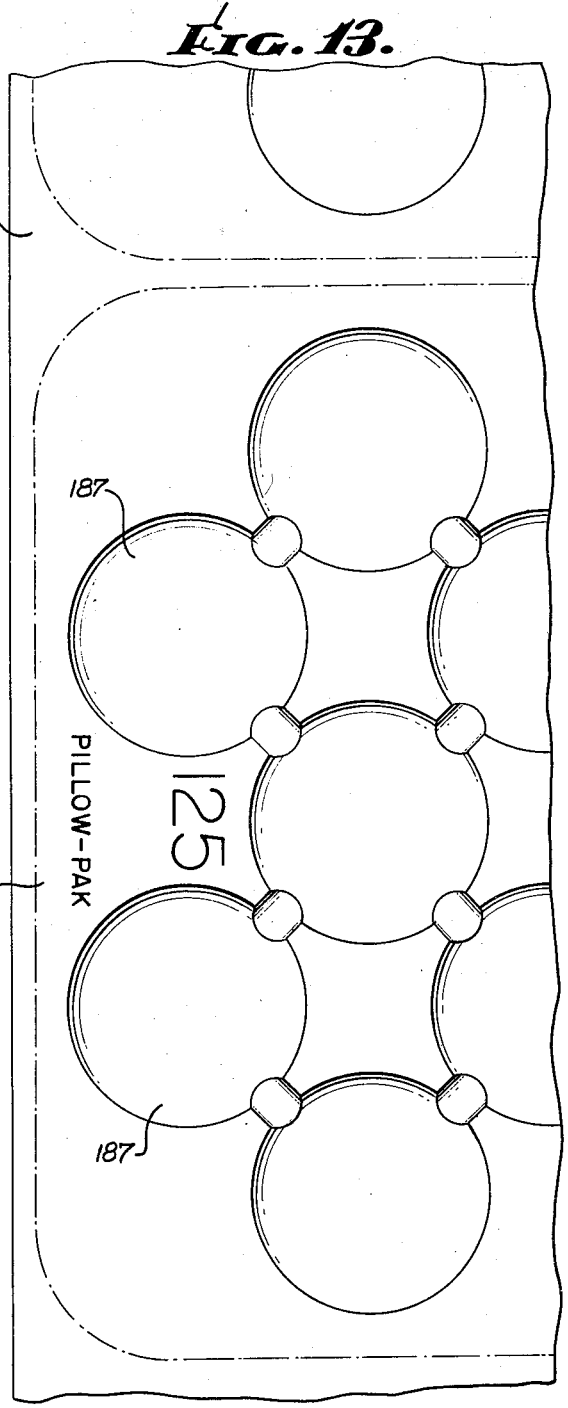
FIGURE 13 is a fragmentary elevational view of the expanded styrene web shown in FIGURE 12 and illustrating fragmentarily areas of said web which have been subjected to the molding operation illustrated in FIGURE 12 and to the embossing operation which is performed concurrently with said molding operation.

Abutting at its side edge with the end walls 94 and secured by screws 114 to bars 112 is a back plate 115. The lower edge of this plate is bevelled at 116 as shown in FIGURE 7 to facilitate the passage of the web 35. Referring now to FIGURES 9, 10 and 11, it is to be noted that back plate 115 is provided on a horizontal middle line thereof, and equally spaced from the center of the plate with a pair of relatively large liquid escape holes 117. Milled from the front face of back plate 115 in end portions thereof is a pair of shallow recesses 122 for accommodating embossing die mounts 123 and 124. Each of these die mounts is provided with a pair of dies 125 and 126 for applying respectively the identifying number and trademark to a particular style of fruit packing tray 127 in forming such a tray from the sheet expanded styrene web 35 (FIGURES 13 and 26).

Each die mount 123 or 124 is a relatively long narrow thin plate of metal having an externally bevelled outer edge 128 which is parallel with the length of the die mount and two forwardly inclined externally tapered edge sections 129 and 130. Mounted in each recess 122 along the outer edge thereof is an internally bevelled die mount guide 131, the bevelled edge of which matches and is adapted to overlie externally bevelled edge 128 of said mount. Mounted in opposite end portions of said recess against the inner edge of the latter are two short internally bevelled upwardly tapering guides 132 and 133 which are adapted to be brought into overlapping trapping relation with the inner tapered edge sections 129 and 130 of die mount 123 or 124 when the latter is inserted downwardly in its respective recess 122 for the purpose of fixing said die mount in a proper operating relationship with the back plate 115. In order that each die mount 123 or 124 will remain securely in place in its respective recess 122 when slid into trapped relation with outer and inner guides 131, 132 and 133, spring plate 137 which is substantially coextensive in area with one of the shallow recesses 122 is perforated to receive the screws used to mount said guides in said recesses and underlie said guides, each such spring plate having slots 138 in the lower end thereof which separates a tongue 139 from said spring plate which is bent from the balance of the plate so as to apply friction to a die mount when the same is slid into operating position in one of the recesses 122 so as to retain said mount in said recess against accidental removal during the operation of the machine 30.

Referring to FIGURES 5, 6, 7 and 8, a pair of double bearing mounts 140 and 141 are secured by cap screws 142 to outer faces of forming tank end walls 94, these mounts housing bearings in which are journaled shafts 143 and 144. End portions of these shafts extend outwardly beyond bearing mount 140 and have secured respectively thereon identical sprockets 145 and 146 which are in radial alignment with each other. Within forming tank 92 web feed rollers 147 and 148 are mounted respectively on shafts 143 and 144, the minimum peripheral spacing between said rollers being less than the thickness of web 35. As clearly shown in FIGURE 8, the peripheral surfaces of thse rollers are provided with identical series of alternate lands 152 and grooves 153 and these series are offset relative to each other so that the lands on roller 147 are disposed opposite the grooves of roller 148 and vice versa. The reason for this arrangement is to enable the rollers 147 and 148 to frictionally grip the web 35 when the same passes around roller 147 and upwardly between this roller and roller 148 so as to control the feeding of said web through the web forming and embossing mechanism 32, without compressing the web in a manner to reduce its thickness as a result of passing between said rollers. To assist in setting up the desired degree of friction between said rollers and said web, peripheral surfaces of the lands 152 are knurled.

Mounted in the forming tank 92 near the bottom thereof on the opposite side thereof from web feed rollers 147 and 148 is a thermostatically controlled electric water heater 154 for maintaining water placed in said tank at a predetermined temperature. Secured to the outer faces of forming tank end walls 94 are bearing mounts 155 and 156 which provide bearings in which a shaft 157 journals, an end portion of said shaft extending outwardly beyond bearing mount 156 and having a shaft rocking arm 158 secured thereto. Fixed on shaft 157 within forming tank 92 are a symmetrically spaced pair of forming mold shifting arms 159.

Secured by cap screws 164 to the rear wall 99 of forming tank 92 is an external pipe connection plate 165 and an internal fixed link pivot mount 166. The plate 165 provides connection for pipes 167 and 168 with the interior of the tank and the mount 166 provides a pivot pin 169 the axis of which is on the same level as the axis of shaft 157 and on which is pivotally mounted the lower end of a link 170. The opposite end of said link has a pivot pin 171 which is located at the same radius from the fixed pivot pin 169 as the radius at which pivot pins 172 at the free extremities of arms 159 are located from the axis of shaft 157.

Pivotally supported on pivot pins 171 and 172 on axes which are spaced apart the same distance as the distance between the axes of the pivot pin 169 and the shaft 157 is a mold carrier 173. This carrier has a central arm 174 which pivotally connects with link 170 and spaced arms 175 which pivotally connect with arms 159.

The mold carrier 173 has a flat front face 180 a major central portion of which is milled away to provide a recess 181 through which hydraulic communication is had through said carrier with a tray mold 182 which has a flat back face 183 wich makes a ground sealing fit with the continuous peripheral portions of face 180 on carrier 173.

Figure 12:
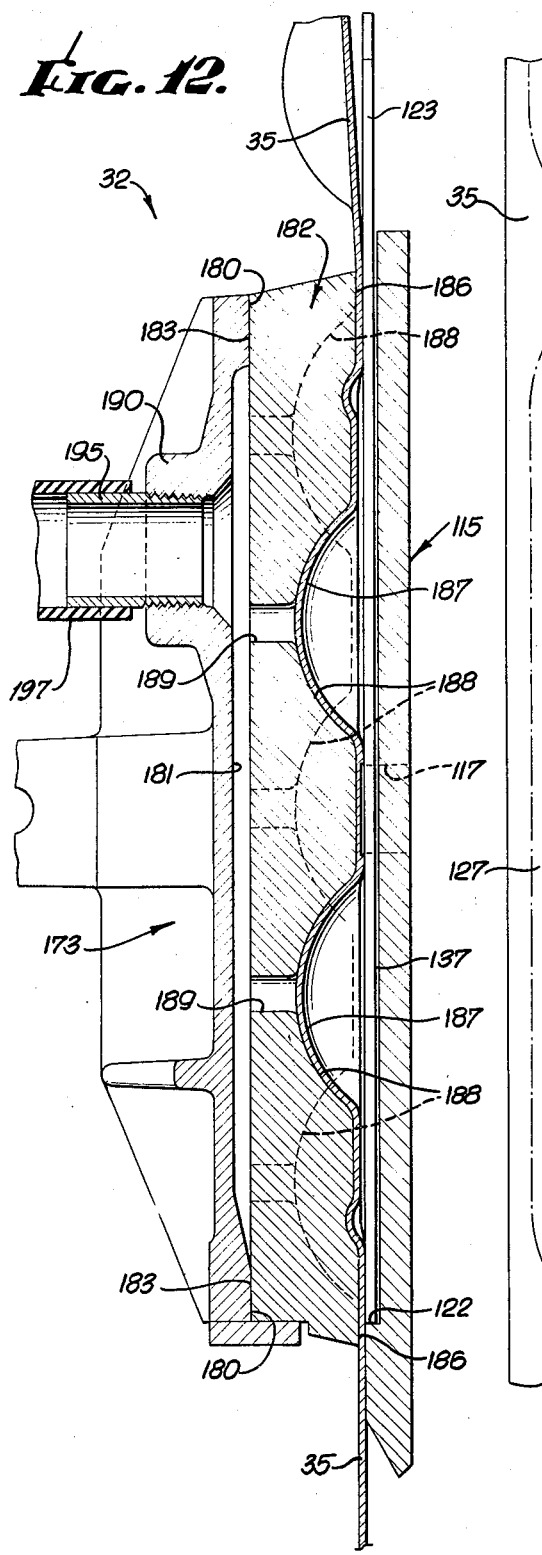
FIGURE 12 is an enlarged vertical sectional view through the mold and back plate of the forming tank of the invention and is taken on line 12—12 of FIGURE 6 with said mold and plate in web compressing relation during the formation of a tray by the invention.

As shown in FIGURES 6 and 7 the carrier provided at its opposite sides with narrow thin mold guide plates 184 and is provided along its bottom edge with a narrow mold stop plate 185. The mold 182 is grooved at its opposite side edges to slideably receive the mold guide plates 184 to guide the mold when the same is inserted downwardly with its ground back face 183 in sliding contact with the flat front face 180 of the mold carrier until the mold comes to rest on the mold stop plate 185 as shown in these views. As shown in FIGURE 12 the mold 182 has a ground flat front face 186 which is parallel with its ground back face 183 with the exception of voids formed in said front face for the purpose of shaping the web 35 in the operation of the machine 30 to produce in said web a series of fruit supporting pockets 187 such as are required in the tray 127 shown in FIGURE 26. Each of the hollows 188 formed in front face 186 of tray mold 182 for the purpose of forming such pockets, is connected by a hole 189 which opens through the back face 183 of the mold into the recess 181 which forms a closed passage for fluid between the carrier and the mold due to the tight peripheral contact between these units. The carrier 173 is provided with bosses 190 in which nipples 195 are mounted for connection with hoses 196 and 197 which in turn connect respectively with pipes 198 and 199 which extend through the end walls 94 of the forming tank as shown in FIGURES 4, 5 and 6.

Tray cutting mechanism 33

This mechanism includes a perimetric substantially rectangular die frame 200 which provides a perimetric die 201, this frame having fixed thereto a pair of shafts 202 which are normal to the plane of the die and symmetrically related thereto, and a perimetric rectangular cutter frame 203 which is slideably mounted on said shafts and which carries a perimetric cutter 204 into and out of cutting relation with said perimetric die. The term "rectangular" is used in an approximate sense because said frames, said die and said cutter are only approximately rectangular as they are rounded at the corners.

The perimetric die frame 200 is secured by bolts 205 to upper and lower angle irons 210 and 211 and opposite ends of these angle irons are mounted for horizontal sliding movement on the frame 37 of the machine through steel blocks 212 which are secured respectively to the main side plates 47 and 48 by screws 213. These blocks are provided with slide gibs 214 which are secured thereto by screws 215. Vertical webs 216 of angle irons 210 and 211 are provided in their end portions with horizontal slots 217 which slideably receive the gibs 214 so that the entire tray cutting mechanism 33 is readily shiftable laterally, horizontally for purposes which will be made clear hereinafter. A means for manually accomplishing fine adjustments in this lateral movement of the tray cutting mechanism include a block 218 having a tapped hole therein and secured to the horizontal web 219 of upper angle iron 210 near one end thereof by screws 220.

A bearing mount 225 is secured by bolts 226 to main frame side plate 48, this mount housing a bearing in which a shaft 227 journals, the shaft being held against endwise movement on said mount by collars 228 and 229, the inner end portion of said shaft being threaded and screwed into the tapped hole in block 218. The outwardly extending end of shaft 227 is provided with a suitably counterbalanced crank handle 230 for use in manually rotating shaft 227 for adjusting the lateral position of the tray cutting mechanism 33 in the frame 37.

The perimetric cutter frame 203 is provided with a pair of web strippers 231 which include thin plates 233 each of which is fixed on the ends of a pair of short shafts 234 which are slideably received in bores 235 provided in blocks 240 which are secured by screws 241 to the perimetric cutter frame 203. The heads of screws 242 which are screwed into tapped holes provided in the ends of the shafts 234 retain these shafts in bores 235. Expansion coil springs 243 which surround the shafts 234 between the plates 233 and the cutter frame 203, bias these plates in extended position but yield readily under pressure to permit the operation of the tray cutting mechanism 33.

Journaled in bearings provided in bearing mounts 244 and 245 which are fixed to frame side plates 47 and 48 at a level located a short distance below slide shafts 202 is a cutter mechanism actuating shaft 246. This shaft extends outwardly a slight distance beyond bearing mount 245 and has fixed thereon an actuating arm 247. Also fixed on shaft 246 and spaced outwardly from the outer ends of the cutter frame 203 are arms 248. Upper ends of the latter arms are pivotally connected to extensible links 249 the opposite ends of which are pivotally connected to the sides of the cutter frame 203.

Secured as by screws 255 to the lower angle iron 211 on the tray cutting mechanism, is a tray accumulating platform 256 having side walls 257, the inner end of this platform extending into contact with the perimetric die 201 as shown in FIGURE 14. The outer end of platform 256 is braced by a pair of tubular braces 258 the upper ends of which are secured by bolts 259 to the upper angle iron 210.

Power system 36

Journaled in bearings 260 and 261 mounted on main side plates 47 and 48 respectively is a cam shaft 262. Mounted on an end portion of cam shaft 262, extending outwardly from bearing 261, is a crank arm 263 which is connected with actuating arm 247 by the pivotal connection of said arms with opposite ends of an extensible link 264. The cam shaft 262 has a large diameter sprocket 265 (see FIGURE 4) which is connected by an endless chain 270 to a drive pinion 271 of a variable speed electric motor 272 which is mounted on horizontal base plate 40.

Fixed on cam shaft 262 between sprocket 265 and bearing 261 is a mold carrier reciprocating cam 273. Mounted in a double bearing structure 274 provided on left main side plate 48 is a stub shaft 275 the outer end of which carries an arm 276 and the inner end of which carries an arm 277. Arm 277 is provided with a cam following roller 278 which rides downwardly into contact with cam 273. The outer end of arm 276 is constantly biased upwardly by a coil spring 279 stretched between said arm and a pin 280 provided on main frame side plate 48. Connected pivotally at its opposite ends to arm 158 and arm 277 is an extensible link 285.

The cam shaft 262 turns in the direction of the arrow 286 in FIGURE 4 and is shown in this view as at the start of a cycle of operation of the machine 30. This is an arbitrarily chosen point in a cycle of operation as a convenient starting place at which to show the relationship of the parts of the machine. All of the views in the drawings show the parts positioned as at this point excepting were noted otherwise. FIGURE 4 shows roller 278 just riding upwardly onto the high dwell of the cam 273 which transmits counter clockwise rotation to the shaft 157 of the web forming and embossing mechanism 32 above described. This causes a leftward movement of the mold carrier 173 and the mold 182 mounted thereon which has just about been completed in FIGURE 7.

The cam shaft 262 also journals in a bearing 287 mounted on a heavy bracket 288 fixed upon the horizontal base plate 40 (FIGURE 21) between the electric motor 272 and an electric motor-pump unit 289 which is also mounted on said horizontal plate 40. Said pump unit includes a centrifugal pump 290 having an intake pipe 291 and a discharge pipe 292.

Mounted on upwardly extending ends of said intake pipe and discharge pipe of pump 290 is a sliding valve 293 having a cylindrical valve chamber 294, entrance to which is had at one end of said chamber through a packing gland 295. Sliding with a fluidtight fit in said gland is a piston rod 300 having spaced pistons 301 and 302 which make a fluid tight fit with the surface of valve chamber 294. As shown in FIGURE 21, the following pipes connect with chamber 294 with each pipe in offset relation with each pipe preceding and following it, in the order in which said pipes are named, to wit: pipe 167; pipe 292; pipe 303; pipe 291 and pipe 168. The functions of the sliding valve 293 are performed by shifting the piston rod 300 so as to move the pistons 301 and 302 from the full line positions in which these are shown in FIGURE 21 to the broken line positions in which they are shown, and then back again.

The shifting of piston rod 300 in this manner is accomplished during each cycle of operation of the machine 30 and the manner in which this is effected will be subsequently described. For the present it is to be noted that with pistons 301 and 302 in their full line positions, water discharged from the pump 290 through the discharge pipe 292 is directed out of the valve 293 exclusively through the pipe 303 which makes a "T" connection with pipes 198 and 199 so that this liquid is delivered through the latter two pipes to the hoses 196 and 197 with which they connect and from these hoses to the mold carrier 173 and is thence, from the internal recess 181 of the mold carrier, through the holes 189 into the hollows 188 of the mold 182.

When the piston rod 300 is shifted to move the pistons 301 and 302 to their broken line positions in FIGURE 21, the intake pipe 291 of pump 290 is connected exclusively with pipe 303 and through the connections of the latter with the internal recess 181 of the mold carrier 173, a vacuum is rapidly imposed upon the hollows 188 provided in the flat front face 186 of said mold. When water under pressure is delivered from the pump 290 to the inner spaces of the mold carrier and mold, this water is withdrawn from the forming tank 92 through pipe 168; and when the valve 293 is so set as to draw a vacuum on the mold 182, the water discharged from the pump 290 in this process is delivered through pipe 167 to forming tank 92.

Mounted on cam shaft 262 between the driven sprocket 265 and the heavy bracket 288 (FIGURE 21) is a hydraulic control cam 304 having a high dwell 305 and a low dwell 306. Mounted on the bracket 288 at its upper extremity is a double bearing structure 307 in which a shaft 308 journals, end portions of said shaft extending in opposite directions from said bearing structure and having arms 309 and 310 fixed thereto and extending upwardly and downwardly, respectively therefrom. Arm 309 lies in a plane close to the axis of valve 293 and an extensible link 315 is connected pivotally at its opposite ends to the piston rod 300 and to the upper end of arm 309. Arm 310, on the other hand, lies in a plane disposed close to cam 304 and has mounted thereon a cam following roller 316 which rides on the periphery of cam 304 and is biased into constant contact with said cam by a coil spring 317. FIGURE 21 shows roller 316 riding on high dwell 305 of cam 304 which causes the piston rod 300 to be so located as to place pistons 301 and 302 in their full line positions shown in this view. When the cam shaft 262 turns sufficiently to cause the roller 316 to ride downwardly onto the low dwell 306 of cam 304, this shifts the arm 309 into its broken line position which shifts the pistons 301 and 302 to their broken line positions shown in this view.

Web feeding mechanism 34

This mechanism includes the web feed rollers 147 and 148, the structure and mode of operation of which have already been described in connection with the description of the web forming and embossing mechanism 32. The balance of the web feeding mechanism 34 includes a pair of short, widely spaced rollers 318 which are fixed on a shaft 319, opposite ends of which journal in suitable bearings provided on plate brackets 320 and 321 which are secured by bolts 322 to the upper ends of main frame side plates 47 and 48. A second pair of identical short, widely spaced rollers 323 is fixed on a shaft 324 opposite ends of which are rotatably supported in bearings provided on plate bearing brackets 325 the lower ends of which are pivotally mounted on suitable bearings secured to upper end portions of main frame side plates 47 and 48 by bolts 326. The rollers 318 and 323 are equally and symmetrically spaced apart from each other on their respective shafts so as to be matched together in pairs, each one of the rollers 323 being in radial alignment with one of the rollers 318 and the rollers 323 are constantly spring biased towards the rollers 318 by coil springs 330 which connect at one pair of their ends to plate bearing brackets 320 and 321 and at their other pair of ends to the bearing brackets 325.

The rollers 318 and 323 are of sufficient length axially and are so located transversely on their respective shafts so as to be in alignment with edge portions of the web 35 as the latter is fed upwardly through the machine 30 in the operation of the latter. These rollers, however, are located above the tray cutter mechanism 33 so that the only part of the web 35 which reaches these rollers is the scrap remnant of the web which is left after the trays 127, shown in FIGURE 26 and outlined by dotted lines in FIGURE 13, have been cut from said web. The manner in which the rollers 318 and 323 function in the operation of the machine will be more clearly described in the operation section.

Fixed on the shafts 319 and 324 between the main frame side plate 47 and the adjacent pair of rollers 318 and 323 are driven sprockets 331 and 332. These sprockets are in radial alignment with each other as well as with a third sprocket 333 which is rotatably mounted on the inner end of a hexagonal stud 334 which is secured by a cap screw 335 to plate bearing bracket 320.

It should be noted that sprockets 331, 332 and 333 are not only in coplanar radial alignment with each other but also are in radial alignment with sprockets 145 and 146 (FIGURE 5) and with idle sprockets 336, 337, 338 and 339 which are rotatably mounted on studs 340, 345, 346 and 347 which are rigidly secured as by cap screws 348 to the main frame side plate 47. Idle sprocket 339 is rotatably mounted on an arm 349 which is pivotally mounted on stud 347 and spring biased by a coil spring 350 for a purpose to be made clear hereinafter.

Mounted on a square plate 351 secured to frame side plate 47 by bolts 352 and secured to said square plate by cap screws 353 is an electromagnetic clutch 354 having an input pinion gear 355, and, coaxially with said gear, and on the inner opposite end of said clutch, an output sprocket 360 which is located a short distance from and in coplanar radial alignment with sprocket 146.

An endless chain 361 is trained around the output sprocket 360 of clutch 354 and the other nine sprockets above described as being in radial alignment with each other and with sprocket 360, and as shown in FIGURE 5, this chain is kept taut by idle sprocket 339 and spring 350. Sprockets 145, 146, 331 and 332 have the same number of teeth so that when clutch 354 is energized and pinion 355 rotated so as to rotate sprocket 360, endless chain 361 causes rotation of shafts 143 and 144 and 319 and 324 in opposite directions at equal speeds of rotation as indicated by arrows adjacent thereto in FIGURE 5 so that the pair of rollers 147 and 148 and the two pairs of rollers 318 and 323 are caused to rotate with their respective shafts so as to concurrently feed web 35 upwardly from the lower portion of forming tank 92 to the top of the machine where the last mentioned two pairs of rollers are located. The uniform diameter of pairs of rollers 318 and 323 is slightly greater than the uniform diameter of feed rollers 147 and 148 so that the action of rollers 318 and 323 on the scrap remnant of the web 35 is to put a tension on this scrap so as to prevent any buckling in the web 35 as it travels upwardly from the web forming and embossing mechanism 32 and through the tray cutting mechanism 33.

Referring now to FIGURES 1, 2, 5 and 17, a relatively large diameter gear 362 has a shaft 363 which is rotatably mounted on a bearing structure provided on main side frame plate 47 so that said gear meshes with pinion 355. Gear 362 has a crank pin 364 which is pivotally connected to one end of an extensible pitman 365, the opposite end of which pivotally connects to a crank pin 366 provided on a sprocket 367 which is rotably mounted on a shaft 368 which is mounted on a suitable bearing structure provided on the main frame side plate 47. Fixed on the adjacent projecting end of cam shaft 262 is a larger sprocket 369 which is in coplanar radial alignment with sprocket 367 and is connected thereto by an endless chain 370. A spring biased sprocket 375 engages the chain 370 from beneath to keep the same taut.

The larger sprocket 369 has exactly twice the number of teeth as the sprocket 367 so that, during each revolution of cam shaft 262, sprocket 367 rotates twice. During each such double rotation of sprocket 367, the connection of this pitman 365 with gear 362 produces two partial rotations in opposite directions of gear 362 between the position in which this gear is shown in FIGURE 5 and the position in which it is shown in FIGURE 17. Whenever the magnetic clutch 354 is de-energized, rotation of the gear 362 has no effect excepting to rotate the pinion 355 of said magnetic clutch 354. Any rotational movement of the gear 362, however, when the magnetic clutch 354 is energized, causes the sprocket 360 to rotate under a direct drive connection through the clutch 354 from the pinion 355. The electrical circuit for clutch 354 includes a switch 376 having a switch actuating arm 377 on the end of which is mounted a roller 378. This roller is normally biased by a spring within the mechanism of the switch 376 so as to lie in the path of a switch actuating adjustable cam 379.

Referring now to FIGURES 18, 19 and 20, it is to be noted that cam 379 is mounted on cam shaft 262 against the hub of sprocket 369 and includes a cam plate 380 and a cam plate 381 both of which have bores which slidably fit the cam shaft 262, and a set collar 382 which holds cam plate 381 against cam plate 380. Cam plate 380 has a set screw 383 which secures it to cam shaft 262. Provided on the cam plates 380 and 381 are pins 384 and 385 outer ends of which are connected by a coil spring 390. Cam plate 380 has a high dwell 391 which is concentric with cam shaft 262 and covers an angle of approximately 45°. At the terminal end of the dwell 391 cam plate 380 is provided with an approximately radical helically bevelled edge 392. Cam plate 381 has a high dwell 393 which is concentric with cam shaft 262 and has the same radius as high dwell 391 on plate 380. High dwell 393 is approximately 30° in length. Cam plate 381 is provided with a tapped hole 394 into which is screwed the threaded stem 395 of an adjustment screw 396 having a tapered end 397 which engages the bevelled edge 392 on cam plate 380 to effect a rotational adjustment of cam plate 381 relative to cam plate 380 so as to vary the combined length of their high dwells 391 and 393 which is presented to roller 378 of switch 376. The effect of this adjustment is to vary the length of time which switch 376 will be closed by the riding of roller 378 on high dwells 391 and 393 of the two cam plates 380 and 381. The significance of this adjustment will be made clear in the description of the operation.

OPERATION

The following steps have to be taken in preparing the machine 30 of the invention for continuous operation in the manufacture of fruit packing trays 127. The web 35 is customarily formed by extrusion and stored in rolls and a means (not shown) is provided for association with each machine 30 for supporting one of these rolls and facilitating the orderly feed of said web from said roll to the machine 30.

As shown diagrammatically in FIGURE 24, the power system 36 is supplied with electricity through main leads L1 and L2 from which the following elements are energized through switches connecting the same with said leads. The order in which these elements are energized is as follows: The preheater 56 and the forming and embossing tank 92 are filled with water up to a desired level and said level constantly maintained throughout the operation of the machine 30 by a level control means 400 which is set in operation by closing switch 401. The electric heaters 58 and 154 for the water thus delivered to preheater tank 56 and forming and embossing tank 92 are energized by closing switches 402 and 403. The drive motor 272 and pump motor 289 are energized by closing switches 404 and 405. As above described, the switch 376 for controlling the energizing of web feed magnetic clutch 354 is automatically actuated by the cam 379 on cam shaft 262.

Before the drive motor 272 and the pump motor 289 are energized, however, it is necessary, if this has not already been done, to insert into the mold carrier 173 a mold 182 having hollow 188 in the front face 186 thereof which are shaped to provide the pattern of pockets required in the style of fruit packing tray 127 which it is desired to make. Trays having many different styles of such patterns are required in the fruit packing industry and a separate mold 182 is required for the manufacture of each of the different styles of trays. The tray manufactured by each mold 182 has a number, which indicates the number of pieces of fruit packed in a box using this style of tray, and the number for the tray 127 illustrated in FIGURES 13 and 26 is 125. In preparing machine 30 for manufacturing this style of tray, embossing die mounts 123 must also be inserted in the back plate 115 which bear dies 125 for applying this identifying number to the trays 127 and also dies 126 for applying a trademark to said trays.

Web 35, of course, must be threaded through the preheating tank 56 which is facilitated by elevating the sinking roller 77 to a position above this tank and threading the web between the tank and said roller, after which said roller may be lowered to form a loop of the web downwardly in tank 56. The web must then be fed over roller 66 and downwardly between front wall 97 and web guide plate 109 of tank 92, around feed roller 147 and upwardly between this roller and feed roller 148 from which point the web is threaded almost straight upwardly out of tank 92 and through tray cutting mechanism 33 to pass between pairs of rollers 318 and 323 so that the end of the web 35 hangs downwardly rearwardly of the machine 30 from over the rollers 318.

Each cycle of operation is divided into parts, the first of which embraces the rotation of the cam shaft 262 while the adjustable switch cam 379 is in contact with switch roller 378 of switch 376 so as to close this switch. This period starts with the parts of the machine 30 positioned as shown in FIGURES 1, 2, 3, 4, 5, 6 and 7. It closes with the parts of the machine 30 positioned as shown in FIGURES 17, 18, 19 and 20. Throughout this first period, switch 376 is held closed by roller 378 riding on top of the combined high dwell of adjustable cam 379. The closing of switch 376 energizes electromagnetic clutch 354 to axially unite gear pinion 355 with drive sprocket 360 and thus impart a rapid rotation to the web feed rollers in the directions indicated by the arrows in FIGURE 5, adjacent to the shafts on which these rollers are mounted, so as to cause this web to travel lineally a distance slightly greater than the width of a single tray 127.

During this first period of each cycle of operation in which the web 35 is traveling to a new position in the machine in preparation for the next forming and cutting operations, the roller 278 is riding on the high dwell of cam 273 thus holding mold carrier and mold 182 in retracted position as shown in FIGURE 7. At the same time cam roller 316 is riding on the high dwell 305 of cam 304 thus holding pistons 301 and 302 in their full line positions as shown in FIGURE 21 so that water discharged from the pump 290 is delivered exclusively through pipe 303 and the pipes 198 and 199 connecting therewith so that this water flows into the carrier 173 and out through the face of mold 182 so as to expel any pockets formed in the web 35 in a previous cycle of operation out of the hollows 188 provided in the front face of the mold 182. In its upward travel out of the tank 92, during the first period of the cycle, the web 35 is thus completely free from hindrance by the mold 182 in responding to the feed rollers and thus moves to its new position in readiness for the forming and cutting operations which are to follow during the second period in said cycle. The reciprocation of the perimetric cutter frame 203, in the tray cutting mechanism 33, is so timed by the setting of arm 263 on the left end of cam shaft 262 that this perimetric frame is approaching its point of maximum withdrawal away from the perimetric die frame 200 as shown in FIGURES 1, 4 and 5, so that the tray cutting mechanism 33 does not interfere with the upward feeding movement of the web 35 therethrough.

As the first period of a cycle of operation closes and the second period thereof opens with the de-energizing of electromagnetic clutch 354 by the adjustable cam 379 traveling upwardly out of contact with the roller 378 as shown in FIGURE 17, the cam following rollers 316 and 278 (see FIGURES 4 and 21) ride downwardly from the upper dwells of cams 304 and 273 respectively onto the lower dwells thereof. This shifts pistons 301 and 302 of control valve 293 to their broken line positions thereby switching the connection of pipe 303 with pump discharge pipe 292 to a connection between pipe 303 and pump intake pipe 291. This reverses the flow of water through the tray forming mold 182 and produces a vacuum in the hollows of the front face of said mold just as said mold is moved forwardly by the spring 279 into firm but yieldable contact with the web 35. This contact presses the latter firmly against the back plate 115 and against the embossing dies on the embossing die mounts 123 so as to simultaneously impart the images of said embossing dies to areas of said embossing dies to areas of the web 35 disposed opposite unrelieved areas of the ground back face 183 of the mold 182, while suction produced by the pump 290 causes a vacuum in the hollows in said mold which sucks the material of the web 35 into said hollows as shown in FIGURE 12 thereby imparting a pattern of pockets to said area of said web which will cause said area when subsequently cut out of said web to constitute a packing tray 127.

Simultaneously with this tray forming and embossing action taking place in the forming tank 92 during the second period of the cycle of operation being described, the rotation of the arm 263 with the cam shaft 262 has advanced to the point where the link 264 is pulled downwardly swinging the arm 247 downwardly with it and rotating shaft 246 to slide perimetric cutter frame 203 along slide shafts 202 to bring the stripper blades 233 into contact with the web 35 thus pressing the latter against the perimetric die 201 as shown in FIGURE 16. Immediately following this, the perimetric cutter 204 is advanced to penetrate the web 35 and the perimetric die 201 to cut from said web a tray 127 having pockets therein formed in a previous cycle of operation while the area of the web 35 forming said tray was subjected to the web forming and embossing mechanism 32.

For convenience, the web forming and embossing operation performed on the web 35 in the manufacture of a tray 127 takes place two cycles prior to the cycle during which said tray is cut from the web 35.

As the crank 263 travels downward past dead center with the link 264 the latter link starts to rise thus reversing the rotation of shaft 246 and starting to retract perimetric cutter frame 203 from its extreme inward position in which it penetrates the web 35 and the perimetric die 201. As this withdrawal of the cutter 204 takes place, expansion of the springs 243 biasing the stripper plates 233 into extended position, causes these stripper plates to hold the marginal scrap portions of the web 35 against the perimetric die 201 during the withdrawal of the perimetric cutter 204 so as to free the latter from engagement with the web 35 thereby permitting the web to readily respond to the pairs of feed rollers of the web feeding mechanism 34 at the start of the next cycle of operation of the machine 30. At the same time the tray 127 just cut from the web 35 is pushed through the perimetric die 201 onto the tray receiving platform 256 the inner end of which terminates right at said perimetric die.

Before the second period of the cycle of operation being described terminates, the perimetric cutter 203 is not only withdrawn from engagment with the web 35 as above described, but the cam roller 316 has ridden up onto the high dwell 305 of the cam 304 thus returning the valve piston 301 and 302 to their full line positions shown in FIGURE 21 thereby reversing the flow of water through the mold 182, breaking the vacuum therein and expelling the pockets, formed by sucking the web 35 into hollows 188, out of said hollows just as cam roller 278 rides upwardly on the high dwell of cam 273 which positively withdraws carrier 173 and mold 182 from compressing relation with web 35 whereby the latter is freed well before the close of the cycle of operation from being impeded in any way by the mold 182 during the feeding movement of the web 35 which starts immediately upon the close of said cycle of operation and the start of the next succeeding cycle.

Trays 127 thus formed in successive cycles of operation of the machine 30 readily nest together as they are propelled by the perimetric cutter 204 through the perimtric die 201 onto the tray collecting platform 266 from which said trays are readily removable in stacks of substantial size for packaging due to the relatively light weight of the material used in making these trays.

Difficulty is sometimes experienced in exactly centering the web 35 in the machine 30 as this is fed upwardly from the forming and embossing tank 92 and through the tray cutting mechanism 33. It being highly desirable that the scrap material left in the web 35 where the latter passes between pairs of rollers 318 and 323 be continuous at both edges of the web, it is sometimes desirable and necessary to shift the entire tray cutting mechanism 33 laterally as by rotating the crank handle 230 shown in FIGURE 22 so that not only will the scrap material along the side borders of web 35 be continuous but this material will be substantially equal in width at each edge of the web.

Leaving the web 35 free to shift slightly laterally in its passage upwardly through the machine 30 and then adjusting the tray cutting mechanism 33 to center the latter relative to the web, permits the tray to be cut from a relatively narrow web 35 by not requiring a large marginal portion of the web to be clamped in place during the cutting operation as is done in machines of the prior art, so that the machine 30 of the invention operates with a marked efficiency in reducing the amount of scrap material left in the web following the cutting of the trays therefrom.

I claim:

1. In a machine for making shaped workpieces from a web of thermoplastic material, the combination of:
   a primary web preheating means;
   a secondary hydraulic-bath web preheating means;
   shaped workpiece forming means submerged in said hydraulic bath means;
   web cutting means;
   means for propelling a web of thermoplastic material lineally in succession through the aforesaid three means in the order named; and
   means for coordinately actuating said forming means and cutting means whereby shaped workpieces are successively produced by said forming means in successive areas of said web while said areas are respectively submerged in said hydraulic bath, and said precise areas of said web are cut therefrom by said cutting means to separate said shaped workpieces from said web.

2. A machine for making shaped workpieces, as recited in claim 1, wherein said secondary preheating means includes:
   a tank for holding a body of hot water;
   means immersed in said water at the bottom of said tank for changing the direction of travel of said web whereby said web may enter said tank in a downword direction and is directed upwardly by said means; said forming means including
   a plate fixed in said tank close to the path of upward travel of said web;
   a forming mold in said tank reciprocable relatively to said plate to press said web thereagainst and then retract to release said web to allow a resumption of the travel of said web through said tank; and
   hydraulic pump means for imposing a vacuum on the space between said forming mold and said web while the latter is compressed between said plate and said mold to shape said web in the area thereof covered by said mold, to conform to said mold.

3. A machine for making shaped workpieces as recited in claim 2 wherein said actuating means includes
   means for reversing the action of said pump means immediately following the vacuum shaping of said web to restore pressure between said mold and said web to strip the shaped web from said mold simultaneously with the retraction of said mold from compressing said web against said plate.

4. A machine for making shaped workpieces as recited in claim 2 wherein
   said web direction-changing means comprises a pair of power driven rollers around one of which said web turns to pass upwardly between and gripped by said rollers whereby said web is positively driven along its path through said tank by said rollers.

5. A machine for making shaped workpieces as recited in claim 4 wherein
   said power driven rollers are spaced apart a distance less than the thickness of said web, and are provided with
      annular grooves in closely spaced offset relation to provide
      knurled annular lands on each roller
      disposed opposite the grooves in the other roller, whereby said rollers grip said web without substantially decreasing its thickness.

6. A machine for making shaped workpieces as recited in claim 2 wherein
   embossing means is provided in said tank for embossing on said workpiece a legend identifying said workpiece, said means being actuated by said forming means.

7. In a machine for making shaped workpieces as recited in claim 2 wherein
   said mold is spring pressed against said web to press said web against said plate to prevent an excess of pressure being applied to said web, said mold being subsequently power retracted from compressing said web.

8. In a machine for making shaped workpieces as recited in claim 2 wherein
   said cutting means are located directly above said forming means, and wherein;
   said web propelling means includes two pairs of rollers spring biased into pressural contact with opposite faces of the remnant of said web extending above said cutting means,
   are power driven to hold an upward tension on said web as it extends upwardly through said forming means and cutting means, and to deliver said web remnant from said machine.

9. In a machine for making shaped workpieces as recited in claim 8 wherein
   means is provided for adjustably laterally shifting said cutting means as a whole to keep the latter properly centered between opposite side edges of said web.

10. In a machine for making shaped workpieces as recited in claim 8 wherein
    microelectric adjusting means is provided to regulate said web propelling means to cause the same to advance said web between pauses in the travel of the latter exactly that distance which advances a web area embracing a shaped workpiece formed by said forming means into registry with said cutting means.

References Cited

UNITED STATES PATENTS

| | | | |
|---|---|---|---|
| 2,108,023 | 2/1938 | Salemme | 18—3 |
| 2,205,029 | 6/1940 | Bonham | 18—3 |
| 2,329,839 | 9/1943 | Kalowski | 18—35 |
| 2,555,369 | 6/1951 | Pollitt et al. | 18—19 |
| 3,115,677 | 12/1963 | Thiel | 18—19 |
| 3,240,851 | 3/1966 | Scalora | 18—19 |
| 3,244,779 | 5/1966 | Levey et al. | 18—19 |
| 3,335,927 | 8/1967 | Zurebel. | |
| 3,244,779 | 5/1966 | Levey et al. | 18—19 |

WILLIAM J. STEPHENSON, Primary Examiner

U.S. Cl. X.R.

18—2